(12) United States Patent
Aoyagi

(10) Patent No.: US 9,575,528 B2
(45) Date of Patent: Feb. 21, 2017

(54) POWER SUPPLY VOLTAGE CONTROL SYSTEM

(71) Applicant: CANON KABUSHIKI KAISHA, Tokyo (JP)

(72) Inventor: Takeshi Aoyagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/703,025

(22) Filed: May 4, 2015

(65) Prior Publication Data

US 2015/0323967 A1    Nov. 12, 2015

(30) Foreign Application Priority Data

May 12, 2014   (JP) .................................. 2014-098888

(51) Int. Cl.
| G06F 1/26 | (2006.01) |
| G06F 1/04 | (2006.01) |
| G06F 1/32 | (2006.01) |

(52) U.S. Cl.
CPC . G06F 1/26 (2013.01); G06F 1/04 (2013.01); G06F 1/324 (2013.01); G06F 1/3296 (2013.01); *Y02B 60/1217* (2013.01); *Y02B 60/1285* (2013.01)

(58) Field of Classification Search
None
See application file for complete search history.

(56) References Cited

U.S. PATENT DOCUMENTS

| 7,024,568 | B2 * | 4/2006 | Maksimovic | G06F 1/3203 327/271 |
| 7,093,143 | B2 * | 8/2006 | Ito | G06F 17/5045 323/284 |
| 7,814,350 | B2 * | 10/2010 | Gaskins | G06F 1/206 327/113 |
| 8,368,457 | B2 * | 2/2013 | Ikenaga | G06F 1/3203 327/530 |
| 8,548,393 | B2 * | 10/2013 | Kokubo | G06F 1/324 455/574 |
| 8,621,257 | B2 * | 12/2013 | Miermont | G06F 1/3203 713/322 |

(Continued)

FOREIGN PATENT DOCUMENTS

JP   2009-010344 A   1/2009

*Primary Examiner* — Thomas J Hiltunen
(74) *Attorney, Agent, or Firm* — Carter, DeLuca, Farrell & Schmidt, LLP

(57) ABSTRACT

A system comprises a semiconductor integrated circuit including a data processing unit that operates in any of a plurality of states, and a selection unit that selects a state from the plurality of states in accordance with a voltage supplied from a power supply unit and makes the data processing unit operate in the selected state, and a power supply unit including a control unit that starts supplying a voltage to the semiconductor integrated circuit based on an initial voltage value setting at startup and makes a voltage to be supplied transit to a predetermined voltage based on information of voltage value in response to a supply voltage having reached the initial voltage value, wherein the selection unit switches the data processing unit to a predetermined state when a supplied voltage has reached the predetermined voltage value from the initial voltage value.

5 Claims, 17 Drawing Sheets

(56) References Cited

U.S. PATENT DOCUMENTS

2003/0076183 A1* 4/2003 Tam .................. G06F 1/3203
331/100
2005/0138444 A1* 6/2005 Gaskins .................. G06F 1/08
713/300

* cited by examiner

| PROCESS VARIATION | CLOCK FREQUENCY [MHz] | CORRECTED VOLTAGE VALUE [V] | CORRECTED VOLTAGE CODE |
|---|---|---|---|
| FAST ↑ | 208 | 0.90 | 111 |
|  | 206 | 0.95 | 110 |
|  | 204 | 1.00 | 101 |
|  | 202 | 1.05 | 100 |
| REFERENCE | 200 | 1.10 | 011 |
| ↓ | 198 | 1.15 | 010 |
|  | 196 | 1.20 | 001 |
| SLOW | 194 | 1.25 | 000 |
| DEFECTIVE | 192 | 1.30 | – |

| INITIAL VOLTAGE CODE | INITIAL VOLTAGE VALUE [V] |
|---|---|
| 00 | 1.00 |
| 01 | 1.10 |
| 10 | 1.20 |
| 11 | – |

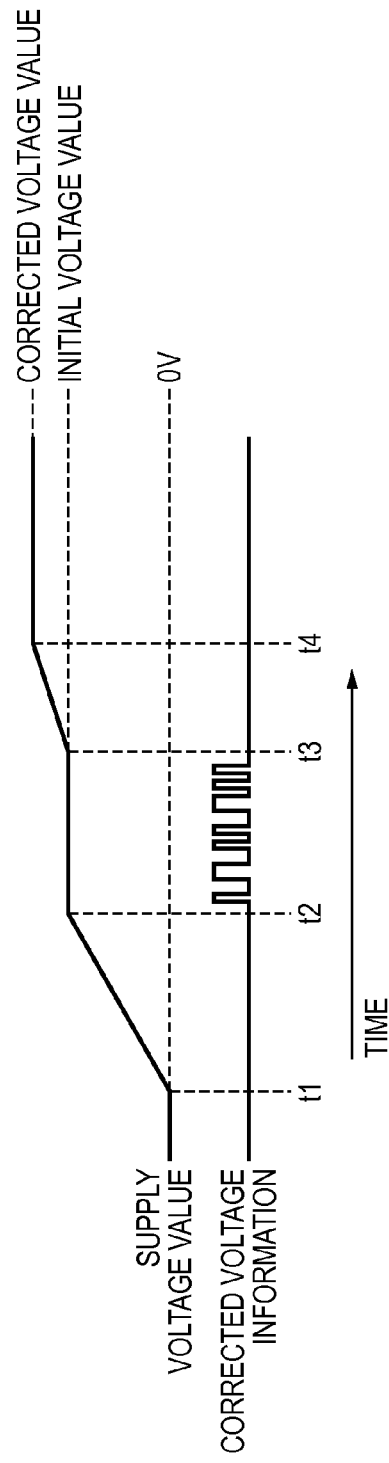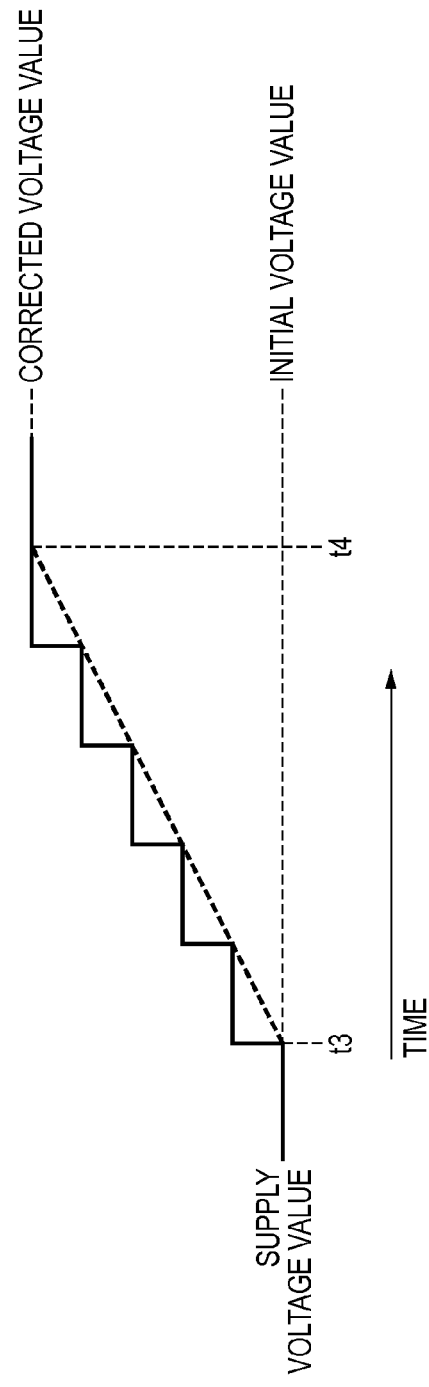

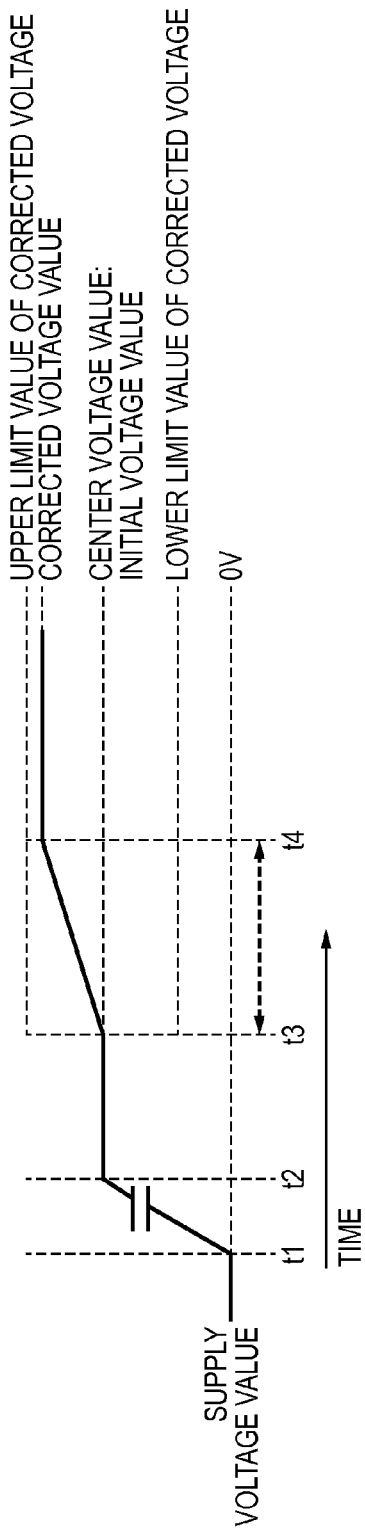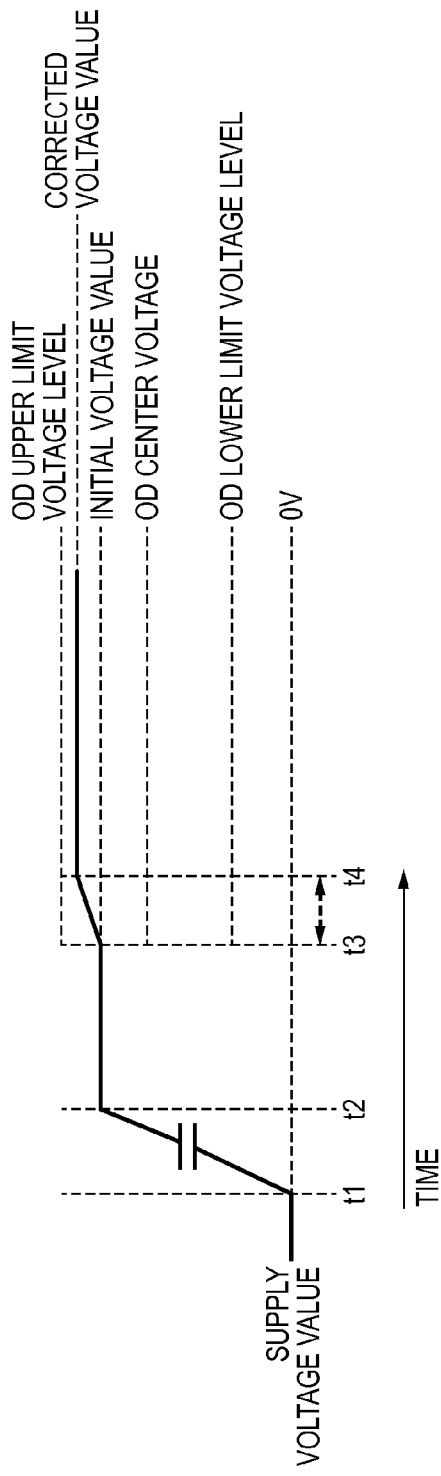

POWER SUPPLY VOLTAGE CONTROL SYSTEM

BACKGROUND OF THE INVENTION

Field of the Invention

The present invention relates to a power supply voltage control system and, more particularly, to a supply voltage control method of supplying a suitable power supply voltage to an internal circuit in a semiconductor integrated circuit such as an ASIC (Application Specific Integrated Circuit).

Description of the Related Art

An ASV (Adaptive Supply Voltage) technique (see, for example, Japanese Patent Laid-Open No. 2009-10344) is available as a technique of supplying a power supply voltage suitable for operating a semiconductor integrated circuit including a plurality of logic circuits at a desired operating frequency. ASV control is a supply voltage control technique to cope with process variation at the time of the manufacture of chips.

ASV control is provided with a process monitor for the recognition of the state of a process in a semiconductor integrated circuit to recognize a process state in a semiconductor integrated circuit from its output information. Control is performed on a semiconductor integrated circuit capable of operating at higher speed than that in a reference state depending on manufacturing variation so as to make the circuit operate upon decreasing the supply voltage within a range in which the circuit normally operates at a target operating frequency. Decreasing the supply voltage will obtain the effect of reducing leakage power in proportion to the voltage and the effect of reducing dynamic power in proportion to the square of the voltage. On the other hand, control is performed on a semiconductor integrated circuit capable of only operating at lower speed than that in a reference state depending on manufacturing variation so as to make the circuit operate upon increasing the supply voltage, thereby making the circuit operate at a target operating frequency.

A power supply unit in ASV control starts up first at an initial voltage value. After the unit executes an ASV control sequence, the voltage transits to a corrected voltage value. That is, the supply voltage to the semiconductor integrated circuit shifts until the voltage is stabilized by the corrected voltage value. For this reason, an unstable operation of an internal logic may cause a trouble in operation. Therefore, control needs a sequence of performing an operation different from a normal operation so as to make the internal logic reliably operate until the operation becomes stable with a corrected voltage value and then switching to a normal logic operation after the supply voltage is stabilized by the corrected voltage value.

The power supply startup time and the sleep return time in a product are items directly associated with usability for the user, and it is a challenge to shorten them as much as possible. Therefore, in order to shorten the power supply startup time and the sleep return time, it is necessary to, for example, shorten the time to switch the operation of the internal logic immediately after transition to a corrected voltage value by ASV control and the transit time from the initial voltage value to the corrected voltage value.

For example, there is available a method (overdriven control) of making a semiconductor integrated circuit operate at higher speed than that at the time of the application of a rated voltage normally used for the circuit by applying a voltage higher than the rated voltage. When performing both overdriven control and ASV control, an internal logic based on overdriven control cannot operate at high speed with an initial voltage value. For this reason, when executing ASV control sequence, the internal logic needs to operate at a low frequency at which it can operate with the initial voltage value. Upon completion of transition to a corrected voltage value, the internal operation clock is switched to a high-frequency clock to keep executing the startup sequence. When performing the processing of switching the operation of an internal logic upon stabilization with a corrected voltage value in ASV control as well as such overdriven control, it is necessary to detect that the internal logic is stabilized by the corrected voltage value and shorten the transit time to the corrected voltage value.

SUMMARY OF THE INVENTION

According to one aspect of the present invention, there is provided a power supply voltage control system comprising a semiconductor integrated circuit and a power supply unit configured to supply a power supply voltage to the semiconductor integrated circuit, the semiconductor integrated circuit including a data processing unit configured to operate in any of a plurality of operating states, a storage unit configured to store information of a voltage value required for the data processing unit to operate in a predetermined operating state, an interface unit configured to output, to the power supply unit, the information of the voltage value stored in the storage unit at startup, and a selection unit configured to select an operating state from the plurality of operating states in accordance with a voltage supplied from the power supply unit and make the data processing unit operate in the selected operating state, and the power supply unit including a control unit configured to start supplying a voltage to the semiconductor integrated circuit based on an initial voltage value setting at startup and make a voltage to be supplied transit to a predetermined voltage based on the information of the voltage value obtained from the interface unit in response to a supply voltage having reached the initial voltage value, wherein the selection unit switches the data processing unit to the predetermined operating state when a voltage supplied by the power supply unit has reached the predetermined voltage value from the initial voltage value.

According to the present invention, it is possible to shorten the power supply startup time of an apparatus.

Further features of the present invention will become apparent from the following description of exemplary embodiments (with reference to the attached drawings).

BRIEF DESCRIPTION OF THE DRAWINGS

FIGS. 5A and 5B are graphs showing the relationship between the output voltage value from a power supply unit and the elapsed time according to the first embodiment;

FIG. 12 is a graph showing a power supply startup state with a conventional initial voltage value setting;

FIG. 13 is a graph showing a power supply startup state with an initial voltage value setting according to the third embodiment;

DESCRIPTION OF THE EMBODIMENTS

<First Embodiment>
[Apparatus Arrangement]

Figure 1:
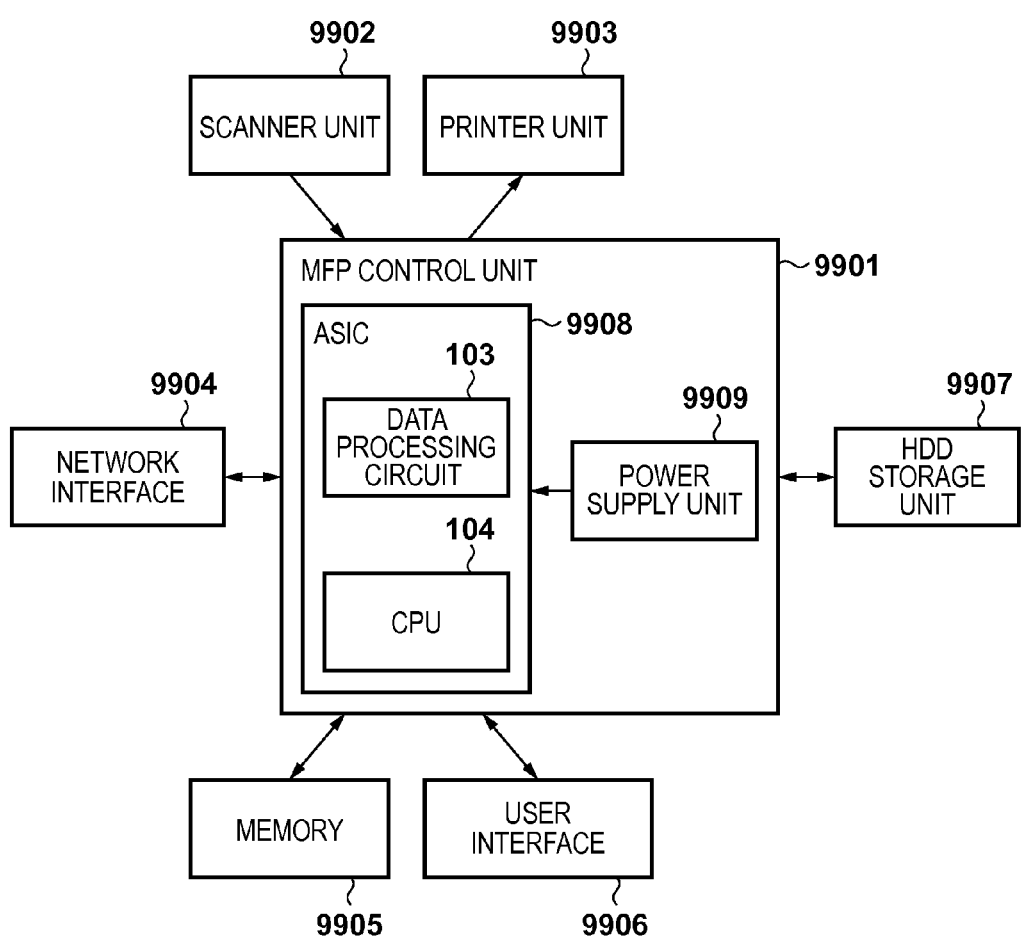
FIG. 1 is a block diagram showing an example of the overall arrangement of an MFP.

This embodiment will exemplify a case in which ASV control is applied to a digital multi-function peripheral system (to be referred to as an MFP hereinafter) which performs scanning, printing, copying, and the like. FIG. 1 is a block diagram showing the overall arrangement of an MFP including a power supply voltage control system according to the embodiment.

An MFP control unit 9901 includes a semiconductor integrated circuit (to be referred to as an ASIC hereinafter) 9908 as a processor which controls the overall system and a power supply unit 9909 which supplies power, as a power supply, to the ASIC 9908. The MFP control unit 9901 is connected to a scanner unit 9902 as an image input device and a printer unit 9903 as an image output device. The MFP control unit 9901 is connected to a network interface 9904 connected to an external network such as a LAN or public line (WAN) to input and output image information and device information.

A memory 9905 is a system work memory for the operation of a CPU 104 in the ASIC 9908 and also an image memory for temporarily storing image data. An HDD storage unit 9907 is a hard disk drive, which stores system software and image data. A user interface 9906 includes a display which displays the state of the MFP and image data, buttons, switches, and a ten-key pad or a touch panel serving as a display, buttons, and the like, which are used to set various types of settings when the user uses the MFP.

The CPU 104 controls the overall system and also performs input/output control and the like for various types of settings and image data with respect to a data processing circuit 103. When, for example, performing a copying operation, the CPU 104 makes settings for various types of image processing in the data processing circuit 103 based on settings from the user interface 9906. Upon completion of settings, the scanner unit 9902 is activated to read a document. After analog/digital conversion and the like of the read image data, the resultant data is input as scan data to the MFP control unit 9901. The MFP control unit 9901 inputs the scan data to the data processing circuit 103 via the CPU 104. The data processing circuit 103 is a data processing unit which processes the input data, and performs image processing in accordance with various types of settings made in advance by the CPU 104 to generate image data for printout. The image data for printout output from the data processing circuit 103 in the MFP control unit 9901 is input to the printer unit 9903 and printed on an output sheet prepared in advance.

In addition, the MFP control unit 9901 receives a printing operation request, a signal for checking the current operating state of the MFP, and the like from a PC and the like connected to an external network (not shown) via the network interface 9904. Upon receiving a printing operation request, the MFP control unit 9901 receives various settings at the time of printing and image data for printing from an external network via the network interface 9904. The CPU 104 in the MFP control unit 9901 makes various types of settings in the data processing circuit 103 in accordance with the input settings, and then inputs the input image data for printing to the data processing circuit 103. The data processing circuit 103 performs image processing in accordance with various types of coefficients set by the CPU 104, and generates image data for printout. The image data for printout output from the data processing circuit 103 in the MFP control unit 9901 is input to the printer unit 9903, thereby printing the image data on a predetermined output sheet.

[Circuit Arrangement]

Figure 2:
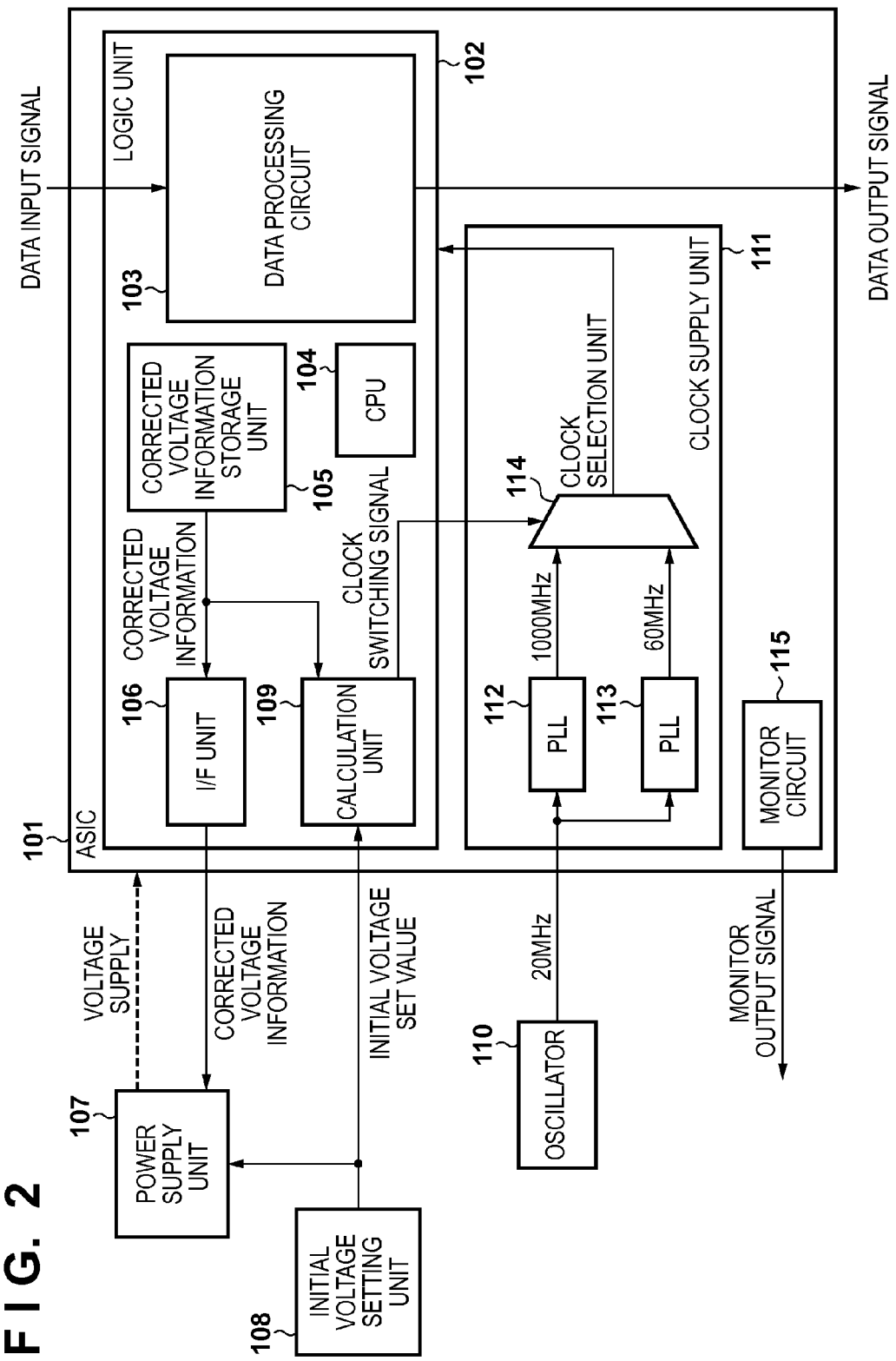
FIG. 2 is a block diagram showing an overall arrangement associated with supply voltage control according to the first embodiment.

FIG. 2 is a block diagram showing the arrangements of the ASIC 9908, its power supply circuit, and a clock generation unit in the MFP control unit 9901 when the overdriven control and ASV control are used according to the first embodiment.

An ASIC 101 corresponds to the ASIC 9908 in FIG. 1. In this embodiment, the ASIC 101 operates at high speed, with a voltage higher than a rated voltage being a center value, by overdriven control. In addition, in the embodiment, the ASIC 101 performs ASV control by exchanging information with a power supply unit 107.

The power supply unit 107 corresponds to the power supply unit 9909 in FIG. 1. In this embodiment, the power supply unit 107 performs power supply startup in accordance with information from an initial voltage setting unit 108, and controls the power supply voltage to be supplied to the ASIC 101 in accordance with corrected voltage information from the ASIC 101. In this case, corrected voltage information is a voltage different from the initial voltage controlled by ASV control, and is information representing the value of a corrected voltage (predetermined voltage) necessary for stable control. In this embodiment, corrected voltage information is provided from a corrected voltage information storage unit 105 to the power supply unit 107 via an I/F unit 106 at the time of the startup of the MFP (power supply startup).

An oscillator 110 supplies clocks for the operation of the ASIC 101. The ASIC 101 incorporates a clock supply unit 111, which converts a clock input from the oscillator 110 into a clock having a higher frequency, and uses it as an operation clock for a logic unit 102 in the ASIC 101. The ASIC 101 incorporates a monitor circuit 115, which outputs information concerning process variation at the time of the manufacture of the ASIC 101 when making checks at the time of the manufacture of the ASIC 101. The corrected voltage information storage unit 105 stores information concerning the power supply voltage required when the ASIC 101 operates at high speed based on the process variation information.

Figures 3, 4A, 4B:
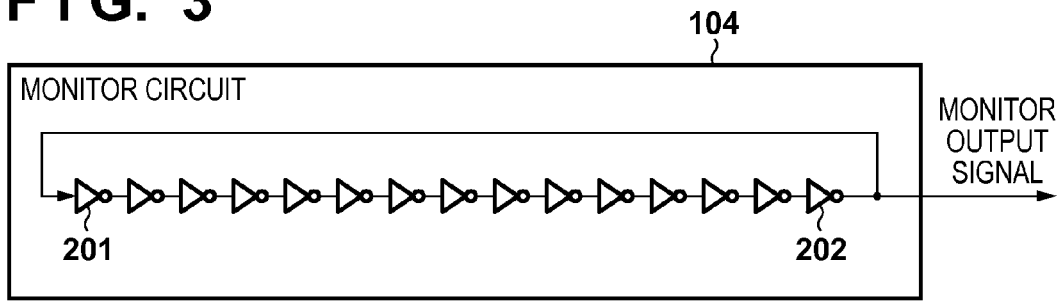
FIG. 3 is a view showing the details of a monitor circuit according to the first embodiment.
FIGS. 4A and 4B are views showing the correspondence among clock frequencies, voltage values, and voltage codes according to the first embodiment.

The monitor circuit 115 detects variations in the operating speeds of circuits in the ASIC 101 due to manufacturing conditions, semiconductor materials, and the like at the time of the manufacture of the ASIC 101, thereby outputting the resultant information. The following will exemplify a monitor circuit formed from a ring oscillator constituted by an odd number (15 in this case) of inverters as shown in FIG. 3. When the logic of an inverter 201 is set to "H" or "L" after the power supply is activated, the logic of the inverter 201 is inverted after the lapse of the delay time of a signal up to an inverter 202. As a result, a clock having a period twice the delay time between the inverter 201 and the inverter 202 is output at a monitor signal part.

If a chip which can operate at a speed higher than a reference speed is manufactured owing to variation originating from a manufacturing process at the time of manufacture, since each inverter in FIG. 3 operates at high speed, the period of each clock output as a monitor signal becomes shorter. That is, a clock having a higher frequency is output. In contrast, if a chip which cannot operate at a speed higher than the reference speed is manufactured owing to manufacturing variation, since each inverter in FIG. 3 operates at low speed, the period of each clock output as a monitor signal becomes longer. That is, a clock having a lower frequency is output. In this case, "high" and "low" indicate values compared with a given reference value at the time of manufacture, and originate from manufacturing variation.

Figure 20:
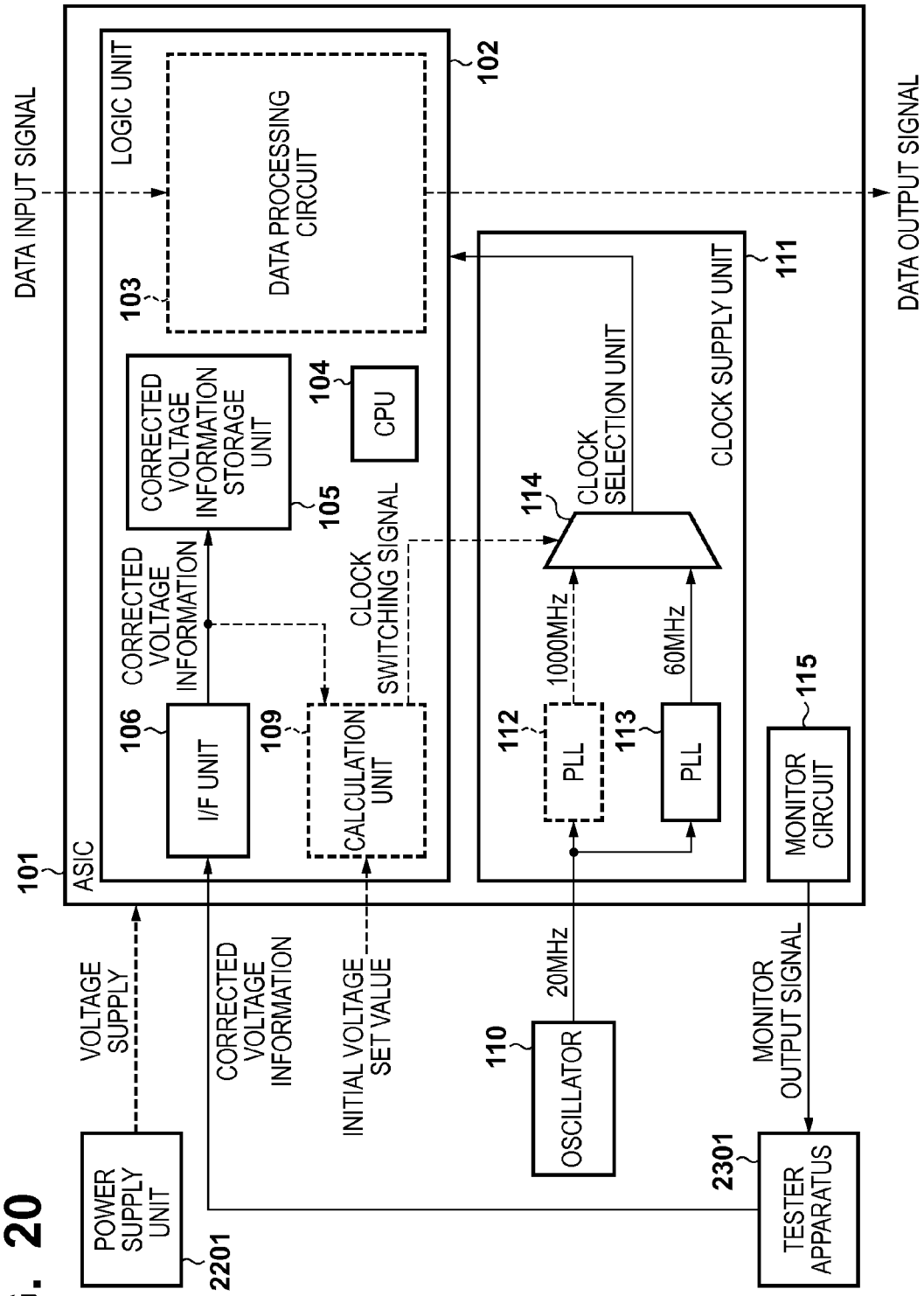
FIG. 20 is a block diagram showing an overall arrangement at the time of setting a corrected voltage using a monitor circuit.

When conducting tests at the time of shipment of the ASIC 101, the ASIC manufacturer connects a tester apparatus 2301 to the ASIC 101, as shown in FIG. 20, to execute various types of tests. A power supply unit 2201 is a power supply for supplying a reference voltage value to the ASIC 101 when performing no overdriven control. In addition, a clock supply unit 111 in the ASIC 101 supplies a clock output from a PLL 113, which is a slower one of clocks output from a plurality of (two in this case) PLLs, to the logic unit 102 via a clock selection unit 114. That is, the MFP (ASIC) according to this embodiment can operate in a plurality of operating states in accordance with the frequencies of clocks. Assume that the operating states in this case include a normal operating state and a high-speed operation based on overdriven control which allows an operation at a speed higher than that in the normal operating state.

The tester apparatus 2301 calculates, based on information from the monitor circuit 115, a specific voltage required for the ASIC 101 to operate at high speed by overdriven control. The calculated voltage value is coded as corrected voltage information represented by a signal of a plurality of bits, and the resultant information is output to the corrected voltage information storage unit 105 in the ASIC 101.

As described above, if a chip which can operate at a speed higher than a reference speed is manufactured, since each inverter shown in FIG. 3 operates at high speed, the period of each clock output as a monitor signal becomes shorter. That is, a clock having a higher frequency is output. In this case, the voltage for an operation at a higher speed by overdriven has a lower value. In contrast, if a chip which cannot operate at high speed is manufactured owing to manufacturing variation, since each inverter in FIG. 3 operates at low speed, the period of each clock output as a monitor signal becomes longer. That is, a clock having a lower frequency is output. In this case, the voltage for a high-speed operation by overdriven has a higher value.

As described above, when conducting tests at the time of shipment of the ASIC 101, the ASIC manufacturer ships out the chip upon converting a voltage value enabling the chip to operate at high speed into a voltage code and storing the voltage code in the corrected voltage information storage unit 105.

[Method of Determining Voltage Code]

An example of a method of determining a voltage code according to this embodiment will be described with reference to FIG. 4A. In this embodiment, the monitor circuit 115 uses a ring oscillator like that shown in FIG. 3, as described above. In this case, the monitor output signal output from the ASIC 101 in FIG. 2 is a clock signal having a certain specific frequency. If the frequency of this clock signal is higher than a given reference value, the chip can be recognized as the one which can operate at high speed, whereas if the frequency is lower than the reference value, the chip can be recognized as the one which can operate only at low speed. A chip capable of operating at high speed can perform processing at high speed even with a voltage lower than a reference voltage. In contrast to this, a chip capable of only operating at low speed can perform processing at high speed by supplying a voltage higher than the reference voltage. Differences from the reference voltage will be described later.

More specifically, the ASIC 101 sets the reference voltage at the time of overdriven to 1.10 V, and sets the lowest and highest voltages to 0.90 V and 1.25 V, respectively. Assuming that a reference voltage of 1.10 V is supplied to an ASIC manufactured in the center of variation, the clock frequency of the monitor output signal output from the monitor circuit 115 is 200 MHz.

When the frequency of a clock output from a monitor output signal is higher than the reference frequency, the chip can perform processing at high speed even if a voltage lower than the reference voltage at the time of overdriven is supplied to the chip. A higher frequency in this case corresponds to 202 MHz, 204 MHz, 206 MHz, 208 MHz, or the like. In contrast, when the frequency of a clock output from a monitor output signal is lower than the reference frequency, the chip can perform processing at high speed by supplying a voltage higher than the reference voltage at the time of overdriven to the chip. A lower frequency in this case corresponds to 198 MHz, 196 MHz, 194 MHz, 192 MHz, or the like.

In this embodiment, as shown in FIG. 4A, assume that the chip can perform processing at high speed with a supply voltage of 1.05 V when operating at 202 MHz, with a supply voltage of 1.00 V when operating at 204 MHz, with a supply voltage of 0.95 V when operating at 206 MHz, and with a supply voltage of 0.90 V when operating at 208 MHz. On the other hand, assume that the chip can perform processing at a desired speed with a supply voltage of 1.15 V when operating at 198 MHz, with a supply voltage of 1.20 V when operating at 196 MHz, with a supply voltage of 1.25 V when operating at 194 MHz, and with a supply voltage of 1.30 V when operating at 192 MHz. Note however that in the embodiment, if the frequency of a clock output from a monitor output signal is less than 194 MHz, the chip is determined as a defective product which cannot be shipped out, because it is not possible to supply a supply voltage exceeding 1.25 V to the chip.

The frequencies of clocks output from monitor output signals are related to supply voltages to be supplied to chips in the above manner. At the time of the manufacture of ASICs, the value of a supply voltage to each chip is stored in the corrected voltage information storage unit 105 in each chip. It is assumed in this embodiment that the corrected voltage information storage unit 105 is a 3-bit wide fuse circuit. The supply voltages to the respective chips, that is, 0.90 V to 1.25 V, which are corrected voltage values, are converted into 3-bit voltage codes and stored in the corrected voltage information storage units 105. In this embodiment, the voltage codes of the respective corrected voltages are defined as shown in FIG. 4A. More specifically, 0.90 V corresponds to "111"; 0.95 V, "110"; 1,00 V, "101"; and 1.05 V, "100". Likewise, 1.10 V corresponds to "011"; 1.15 V, "010"; 1.20 V, "001"; and 1.25 V, "000". The ASIC manufacturer stores the voltage codes in the corrected voltage information storage units 105 at the time of the manufacture of ASICs.

At the time of the use of a product, the MFP starts up the power supply based on the initial voltage set value, reads out the stored corrected voltage information, and controls a supply voltage to the corrected voltage based on the readout value. Subsequently, the MFP transits to an overdriven operation. The power supply unit 107 performs initial voltage value setting with an external pin. In this embodiment, initial voltage values in three steps are converted into 2-bit initial voltage codes, and initial voltage value setting is performed by pulling up/pulling down the external pin on an implementation board.

In this embodiment, as shown in FIG. 4B, the initial voltage codes "00", "01", and "10" respectively correspond to initial voltage values of 1.00 V, 1.10 V, and 1.20 V. In addition, in the embodiment, the initial voltage code is "01", and a reference voltage of 1.10 V at the time of overdriven control becomes an initial voltage value. This makes it possible to equally cope with either a case in which a corrected voltage value is higher than the initial voltage value or a case in which a corrected voltage value is lower than the initial voltage value.

FIGS. 5A and 5B are graphs each showing the relationship between the supply voltage value output from the power supply unit 107 and the elapsed time from power supply ON. Referring to FIG. 5A, the ordinate represents the voltage value, and the abscissa represents the elapsed time. When the supply voltage gradually increases from power supply ON (t1) and reaches 1.10 V (t2), which is the initial voltage value, the ASIC 101 recognizes that the voltage has reached the initial voltage value. The ASIC 101 starts to operate when the voltage has reached the initial voltage value (t2). The ASIC 101 then outputs a corrected voltage information signal to the power supply unit 107 (t2 to t3). Subsequently, the power supply unit 107 changes the supply voltage value to the corrected voltage value based on the corrected voltage information signal output from the ASIC 101 (t3 to t4). At t4, the power supply unit 107 completes the transition to the corrected voltage value.

FIG. 5B is an enlarged view of a transit portion to the corrected voltage value from t3 to t4 in FIG. 5A. The power supply unit 107 increases and decreases an output voltage in increments of several mV stepwise for transition from the initial voltage value to the corrected voltage value. Therefore, the time taken for the completion of transition from the initial voltage value to the corrected voltage value changes depending on the magnitude of the difference between the initial voltage value and the corrected voltage value and the specifications of the power supply unit 107 which are associated with control at the time of voltage transition.

Assume that in this embodiment, when the power supply unit 107 transits from the initial voltage value to the corrected voltage value, it takes 2 msec for a voltage change of 10 mV. That is, the amount of change in voltage per unit time at the time of voltage value transition is 5 [V/sec]. When performing both overdriven control and ASV control, the following control is performed. Assume that the logic unit 102 in the ASIC 101 is a circuit capable of performing a high-speed operation at 1,000 MHz based on the premise of overdriven. In the embodiment, a supply voltage of 1.20 V is required for the logic unit 102 to operate at 1,000 MHz. Therefore, the 3-bit code data "001" is stored as a corrected voltage code in the corrected voltage information storage unit 105.

As shown in FIG. 5A, a voltage from the power supply unit 107 is controlled such that the ASIC 101 starts up once with the initial voltage value, control is performed on transfer of corrected voltage information and the like, and the voltage then transits to the corrected voltage value. Assume that in this embodiment, the initial voltage value is 1.10 V.

The logic unit 102 in the ASIC 101 is a circuit capable of operating at 1,000 MHz based on the premise of overdriven. However, it is not possible to guarantee a proper operation at 1,000 MHz during the supply of 1.10 V, which is the initial voltage value. The logic unit 102 in the ASIC 101 can perform a proper operation at 1,000 MHz when the supply voltage becomes 1.20 V, which is the corrected voltage value. For this reason, during the period of the initial voltage value after power supply startup, a clock having a low frequency is used to allow the logic unit 102 to reliably operate, and control is performed on transfer of corrected voltage information and the like. Upon completion of transition to the corrected voltage value, the clock is switched to a clock having a high frequency of 1,000 MHz.

The clock supply unit 111 in this embodiment is constituted by a PLL 112, a PLL 113, and the clock selection unit 114. The PLL 112 generates a 1000 MHz output clock from a 20 MHz input clock output from the oscillator 110. The PLL 113 generates a 60 MHz output clock. The clock selection unit 114 selects a 60 MHz clock generated by the PLL 113 or a 1000 MHz clock generated by the PLL 112 based on the clock switching signal output from the logic unit 102. During the period of the initial voltage value after power supply startup, the 60 MHz clock generated by the PLL 113 is output to the logic unit 102 to allow it to reliably operate, and control is performed on transfer of corrected voltage information and the like. Upon completion of transition to the corrected voltage value, the clock is switched to the 1000 MHz clock output from the PLL 112.

In general, in this clock switching operation, the time taken for transition is set based on the assumption of the time when the difference between the initial voltage value and the corrected voltage value is maximized, and the maximum time taken for transition to the voltage from the specifications of the power supply unit which are associated with control at the time of voltage transition. However, if the difference between the initial voltage value and the corrected voltage value is small, voltage transition is completed in a time shorter than the assumed time, and hence the subsequent wait time unnecessarily increases the power supply startup time. In this embodiment, therefore, timing control for clock switching is performed in accordance with the difference between the initial voltage value and the corrected voltage value to reduce the extra wait time.

Figure 6A:
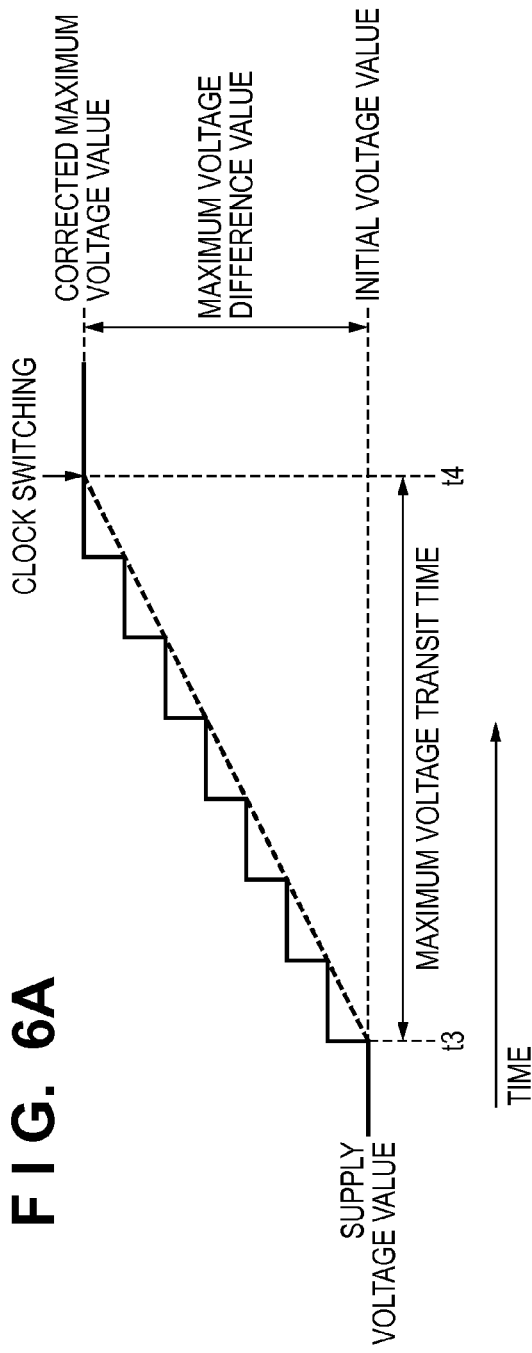
FIGS. 6A and 6B are graphs showing the relationship between difference values and transit times according to the first embodiment.
Figure 6B:
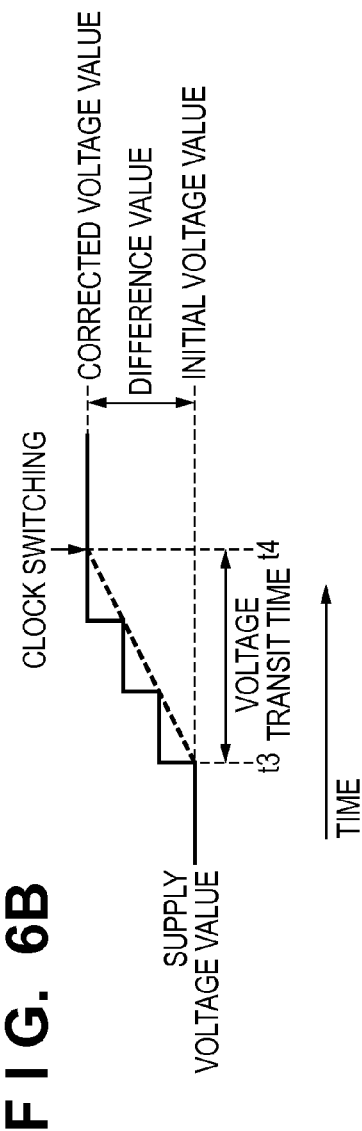

Assuming a case in which the difference between the initial voltage value and the corrected voltage value is maximized (which will be referred to as a maximum voltage difference value hereinafter) as shown in FIG. 6A, the time taken for transition to the difference (which will be referred to as the maximum transit time hereinafter) is calculated in advance. If the difference between the initial voltage value and the corrected voltage value is smaller than the maximum voltage difference value as shown in FIG. 6B, a voltage transit time is calculated in accordance with the ratio of the difference to the maximum voltage difference value, and clock switching is performed at the time point when the transition to the corrected voltage value is complete. That is, if the difference value between the initial voltage value and the corrected voltage value is ⅓ of the maximum voltage difference value, the transit time from the initial voltage value to the corrected voltage value is ⅓ of the maximum transit time. For this reason, clock switching is performed at the calculated time point when the transition has been complete, based on this transit time.

In this embodiment, the initial voltage value is set to 1.10 V, and the voltage after correction is 0.90 V at minimum and 1.25 V at maximum, as shown in FIG. 4A. For this reason, the difference between the initial voltage value and the corrected voltage value is maximized when the voltage transits over a voltage difference of 0.20 V from 1.10 V to 0.90 V. According to the specifications of the power supply unit in this embodiment, since it takes 2 msec to transit to 10 mV, the time taken for voltage transition to 0.20 V is 40 msec.

If, however, "001" is actually stored as a corrected voltage code in the corrected voltage information storage unit 105 in the ASIC 101, a supply voltage of 1.20 V is required for the ASIC 101 to operate at 1,000 MHz. In this case, the difference between the initial voltage value and the corrected voltage value is 0.10 V. Therefore, the transit time from the initial voltage value to the corrected voltage value is 20 msec. This embodiment is configured to perform timing control for clock switching in accordance with the transit time differences among ASICs.

An arrangement configured to perform switching control for the above clock switching signals will be described in detail. A calculation unit 109 in FIG. 2 receives an initial voltage set value from the initial voltage setting unit 108 and corrected voltage information from the corrected voltage information storage unit 105. The calculation unit 109 then performs output control for clock switching signals output to the clock selection unit 114 based on these values.

Figure 7:
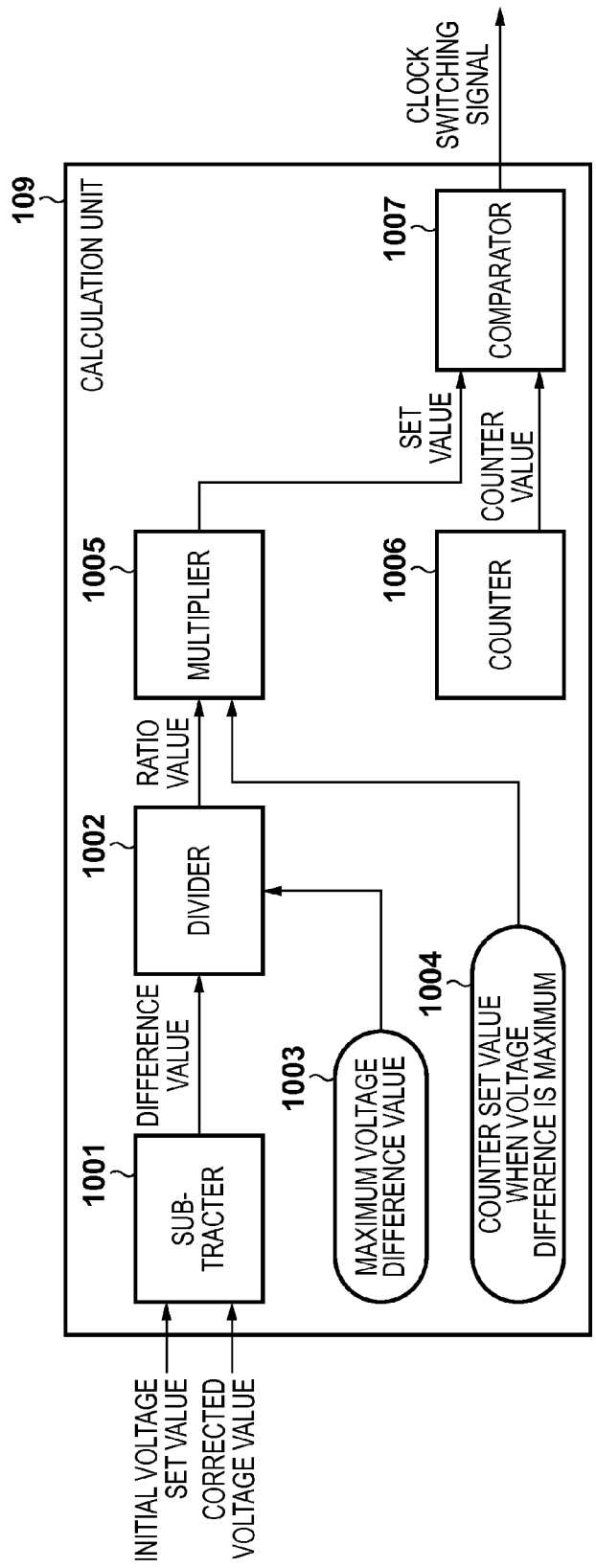
FIG. 7 is a block diagram showing the internal arrangement of a calculation unit according to the first embodiment.

The calculation unit 109 has an internal arrangement like that shown in FIG. 7. A subtracter 1001 calculates the absolute value of the difference (difference value) between the initial voltage set value and the corrected voltage value input to the calculation unit 109. A divider 1002 calculates the ratio (ratio value) of the transit time to the difference value to the maximum voltage transit time by dividing the difference value by a preset maximum voltage difference value. A multiplier 1005 calculates a counter value (set value) for counting the time taken by the ASIC 101 to transit to the corrected voltage by multiplying a counter set value for counting the maximum transit time with the maximum voltage difference value calculated in advance by the ratio value. A comparator 1007 compares the set value with the counter value output from a counter 1006 which counts the voltage transit time. If the counter value becomes equal to the set value, the comparator 1007 outputs a clock switching signal to cause the PLL 112, which outputs a high-frequency clock, to output an output clock to the logic unit 102.

[Control Procedure]

Figure 8:
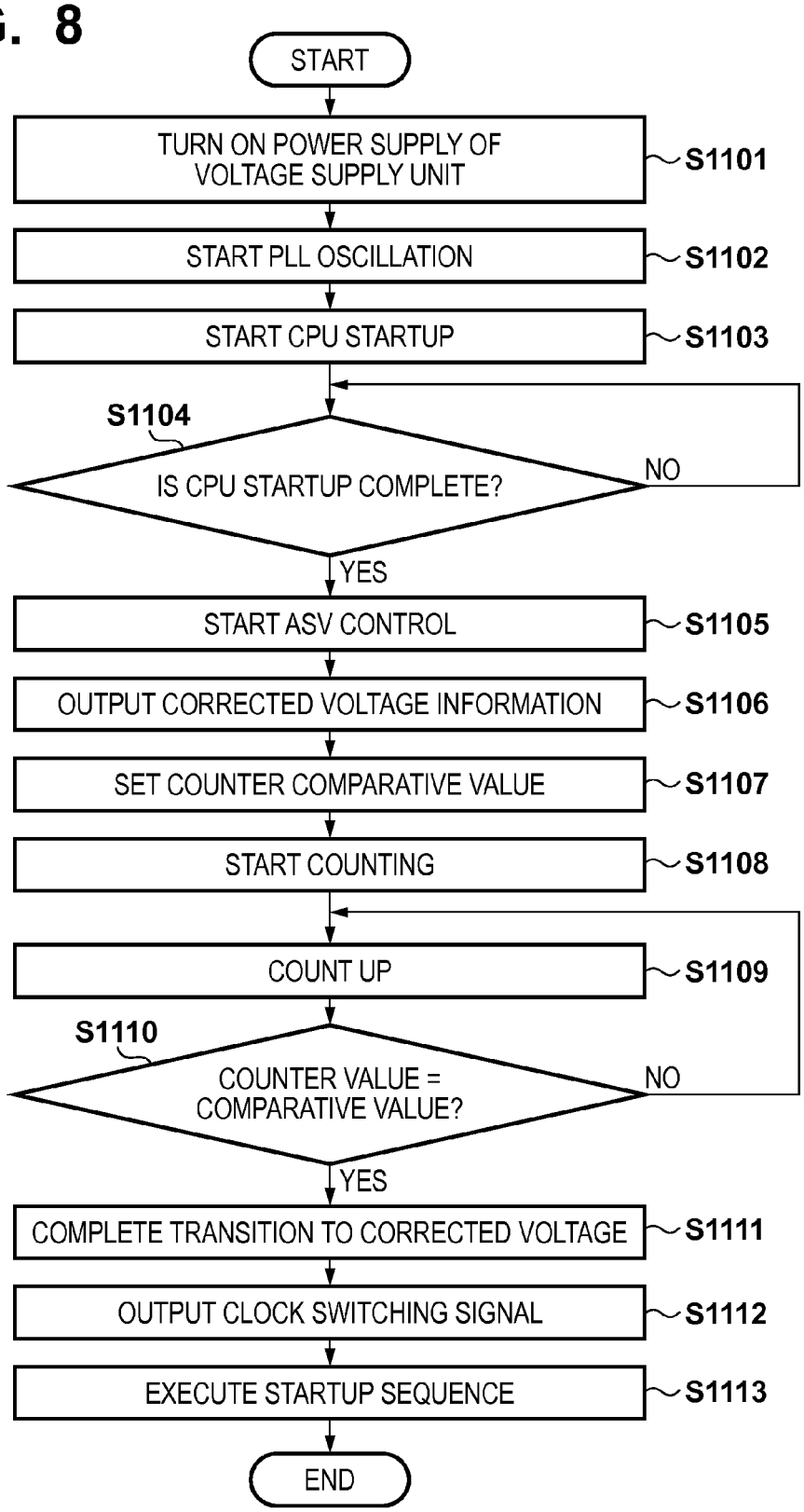
FIG. 8 is a flowchart of timing control for clock switching according to the first embodiment.

FIG. 8 is a procedure for timing control for clock switching.

When the user of the MFP turns on the power supply of the MFP at time t1 in FIG. 5A, the power supply of the power supply unit 107 in FIG. 2 is turned on (step S1001). In the time interval from t1 to t2 in FIG. 5A, the voltage supplied from the power supply unit 107 gradually increases from 0 V.

In the ASIC 101, upon detection that the supply voltage from the power supply unit 107 has reached the initial voltage value (time t2 in FIG. 5A), the PLL 112 and the PLL 113 start to oscillate accompanying an input from the oscillator 110 (step S1102). In the initial state of the clock selection unit 114 at the time of power supply startup, the PLL 113 is selected, and hence the logic unit 102 operates with a 60 MHz clock from the PLL 113.

Subsequently, in accordance with the startup sequence (not shown) stored in a ROM (not shown) or the like, the startup of the CPU 104 starts (step S1103). Upon completion of the startup of the CPU 104 (YES in step S1104), ASV control is started under the control of the CPU 104 (step S1105).

In ASV control, first of all, the ASIC 101 outputs corrected voltage information to the power supply unit 107 and the calculation unit 109 in the ASIC 101 (step S1106). The procedure from step S1102 to step S1106 corresponds to the time interval from t2 to t3 in FIG. 5A. The supply voltage from the power supply unit 107 transits from the initial voltage value to the corrected voltage value at the time point (time t3 in FIG. 5A) when the input of the corrected voltage information is complete. The calculation unit 109 in the ASIC 101 sets a set value in the comparator 1007 based on the initial voltage set value and the corrected voltage information at the time point (time t3 in FIG. 5A) when the input of the corrected voltage information is complete. Thereafter, the counter 1006 starts counting (step S1108), and proceeds with the counting up operation (step S1109).

When the counter value reaches the counter comparative value (YES in step S1110 at time t4 in FIG. 5A), the calculation unit 109 determines that the transition of the supply voltage from the initial voltage value to the corrected voltage value is complete (step S1111). The clock switching signal output from the calculation unit 109 is switched from the logic to select the PLL 113 in the initial state to the logic to select the PLL 112 (step S1112). Subsequently, the system startup sequence is executed with the high-speed clock of 1,000 MHz output from the PLL 112 (step S1113).

As described above, according to this embodiment, it is possible to perform clock switching immediately after the completion of transition to the corrected voltage by calculating the transit time from the initial voltage value to the corrected voltage value from the difference between the initial voltage value and the corrected voltage value and changing the set value of the counter comparative value.

Note that this embodiment has exemplified the clock switching timing accompanying overdriven control concerning an operation after the completion of transition to the corrected voltage. However, this case is not limited to this control. When an internal logic operation is switched after the supply voltage is stabilized at the corrected voltage value at the time of the execution of ASV control, the internal logic operation is switched upon detecting at an earlier timing that the supply voltage is stabilized at the corrected voltage value. This makes it possible to transit to the subsequent processing earlier.

<Second Embodiment>

According to the first embodiment, the calculation unit in the ASIC calculates the time taken to reach a corrected voltage value from the largest voltage difference between the initial voltage value and the corrected voltage value and the voltage difference between the initial voltage value and the corrected voltage value input from the corrected voltage information of the ASIC. This embodiment has no calculation unit in an ASIC but includes a voltage detection unit outside the ASIC to control clock switching signals by directly detecting the supply voltage from the power supply unit.

[Circuit Arrangement]

Figure 9:
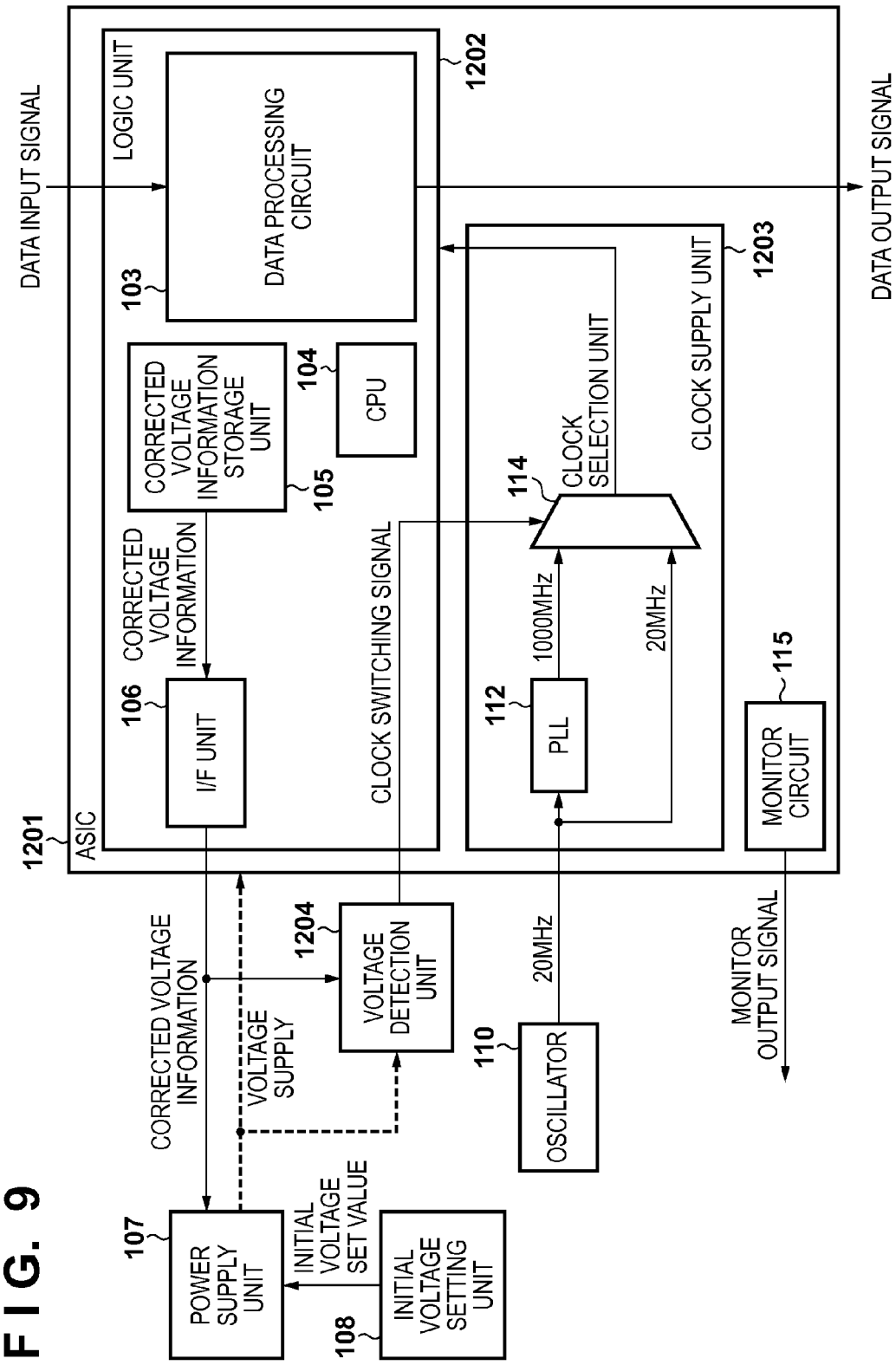
FIG. 9 is a block diagram showing an overall arrangement associated with supply voltage control according to the second embodiment.

FIG. 9 is a block diagram showing the arrangements of an ASIC 9908 in an MFP control unit 9901, its power supply circuit, and a clock generation unit when the overdriven control and ASV control according to the second embodiment are used. The same terms and reference numerals denote the same parts as those described in the first embodiment, and a detailed description of them will be omitted.

An ASIC 1201 corresponds to the ASIC 9908 in FIG. 1. In this embodiment, the ASIC 1201 performs a high-speed operation by overdriven control using a voltage higher than the rated voltage as a center value. In addition, the ASIC 1201 in this embodiment performs ASV control by exchanging information with a power supply unit 107.

The power supply unit 107 corresponds to the power supply unit 9909 in FIG. 1. The power supply unit 107 in this embodiment activates the power supply in accordance with information from an initial voltage setting unit 108, and transits to the power supply voltage to be supplied to the ASIC 1201 in accordance with corrected voltage information from the ASIC 1201. An oscillator 110 supplies a clock to make the ASIC 1201 operate. The ASIC 1201 incorporates a clock supply unit 1203, and converts the clock input from the oscillator 110 into a clock having a high frequency, which is used as an operating frequency for a logic unit 1202 in the ASIC 1201.

The ASIC 1201 incorporates a monitor circuit 115, which outputs information concerning process variation at the time of the manufacture of the ASIC 1201 when making checks at the time of the manufacture of the ASIC 1201. A corrected voltage information storage unit 105 stores information concerning the power supply voltage required when the ASIC 1201 operates at high speed based on the process variation information. Since the details of this operation are the same as those in the first embodiment, a detailed description will be omitted.

In this embodiment, when performing both overdriven control and ASV control, the following control is performed. Assume that the logic unit 1202 in the ASIC 1201 is a circuit capable of performing a high-speed operation at 1,000 MHz based on the premise of overdriven. In the embodiment, a supply voltage of 1.20 V is required for the logic unit 1202 to operate at 1,000 MHz. Therefore, the 3-bit code data "001" is stored as a corrected voltage code in the corrected voltage information storage unit 105, as shown in FIG. 4A.

As shown in FIG. 5A, a voltage from the power supply unit 107 is controlled such that the ASIC 1201 starts up once with the initial voltage value, control is performed on transfer of corrected voltage information and the like, and the voltage then transits to the corrected voltage value. Assume that in this embodiment, the initial voltage value is 1.10 V.

The logic unit 1202 in the ASIC 1201 is a circuit capable of operating at 1,000 MHz based on the premise of overdriven. However, it is not possible to guarantee a stable proper operation at 1,000 MHz during the power supply of 1.10 V, which is the initial voltage value. The logic unit 1202 in the ASIC 1201 can perform a proper operation at 1,000 MHz when the supply voltage becomes 1.20 V, which is the corrected voltage value. For this reason, during the period of the initial voltage value after power supply startup, a clock having a low frequency is used to allow the logic unit 1202 to reliably operate, and control is performed on transfer of corrected voltage information and the like. Upon completion of transition to the corrected voltage value, the clock is switched to a clock having a high frequency of 1,000 MHz.

The clock supply unit 1203 in this embodiment is constituted by a PLL 112 and a clock selection unit 114. The PLL 112 generates a 1000 MHz output clock from a 20 MHz input clock output from the oscillator 110. The clock selection unit 114 selects a 20 MHz input clock or a 1000 MHz clock generated by the PLL 112 based on the clock switching signal output from the logic unit 1202. During the period of the initial voltage value after power supply startup, the clock selection unit 114 outputs the 20 MHz clock, which is the input clock, to the logic unit 1202 to allow it to reliably operate, and control is performed on transfer of corrected voltage information and the like. Upon completion of transition to the corrected voltage value, the clock selection unit 114 switches the clock to be supplied to the 1000 MHz clock output from the PLL 112.

A voltage detection unit 1204 in FIG. 9 receives corrected voltage information and monitors the power supply voltage supplied from the power supply unit 107 to the ASIC 1201. When the supply voltage matches the corrected voltage value, the clock switching signal is switched.

Figure 10:
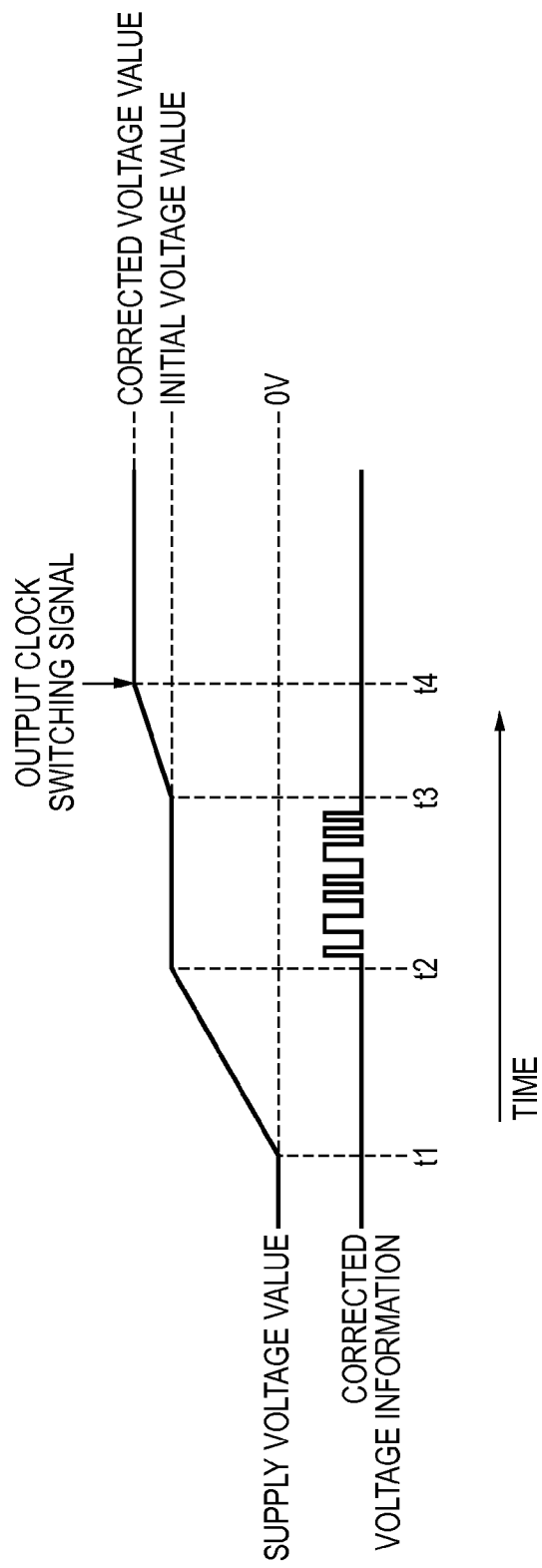
FIG. 10 is a graph showing the relationship between the output voltage value from a power supply unit and the elapsed time according to the second embodiment.

FIG. 10 is a graph showing the relationship between the voltage value output from the power supply unit 107 and the elapsed time from power supply ON according to this embodiment. Referring to FIG. 10, the ordinate represents the voltage value, and the abscissa represents the elapsed time. When the supply voltage gradually increases from power supply ON (t1) and reaches 1.10 V (t2), which is the initial voltage value, the ASIC 1201 recognizes that the voltage has reached the initial voltage value. The ASIC 1201 starts to operate when the voltage has reached the initial voltage value (t2). The ASIC 1201 then outputs a corrected voltage information signal to the power supply unit 107 (t2 to t3). Subsequently, the power supply unit 107 changes the supply voltage value to the corrected voltage value based on the corrected voltage information signal output from the ASIC 1201 (t3 to t4). At t4, the power supply unit 107 completes the transition to the corrected voltage value.

The voltage detection unit 1204 receives corrected voltage information in advance and monitors the power supply voltage supplied from the power supply unit 107 to the ASIC 1201. When the supply voltage matches the corrected voltage value, the voltage detection unit 1204 transmits a clock switching signal to the clock selection unit 114 to switch from the 20 MHz input clock in the initial state to the 1000 MHz clock generated by the PLL 112.

[Control Procedure]

Figure 11:
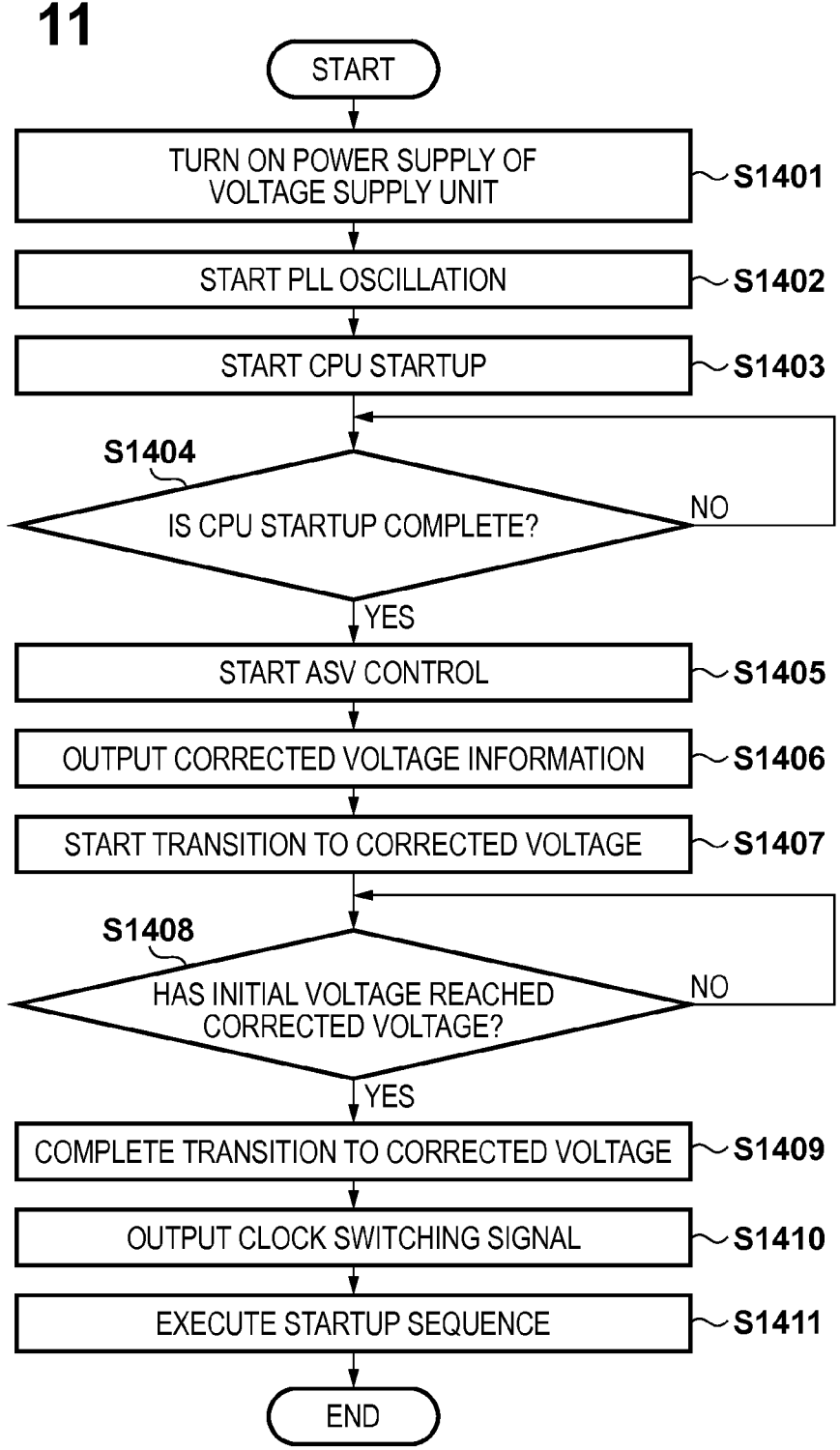
FIG. 11 is a flowchart of timing control for clock switching according to the second embodiment.

FIG. 11 shows a procedure for timing control for clock switching.

When the user of the MFP turns on the power supply of the MFP at time t1 in FIG. 10, the power supply of the power supply unit 107 in FIG. 12 is turned on (step S1401). In the time interval from t1 to t2 in FIG. 10, the voltage supplied from the power supply unit 107 gradually increases from 0 V.

In the ASIC 1201, upon detection that the supply voltage from the power supply unit 107 has reached the initial voltage value (time t2 in FIG. 10), the PLL 112 starts to oscillate (step S1402). In the initial state of the clock selection unit 114 at the time of power supply startup, the 20 MHz clock, which is the input clock, is selected. At this time point, the logic unit 1202 operates with the 20 MHz clock. Subsequently, in accordance with the startup sequence (not shown) stored in a ROM (not shown) or the like, the startup of a CPU 104 starts (step S1403). Upon completion of the startup of the CPU 104 (YES in step S1404), ASV control is started under the control of the CPU 104 (step S1405). In ASV control, first of all, the ASIC 1201 outputs corrected voltage information to the power supply unit 107 and the voltage detection unit 1204 (step S1406). The procedure from step S1402 to step S1406 corresponds to the time interval from t2 to t3 in FIG. 10.

The supply voltage from the power supply unit 107 transits from the initial voltage value to the corrected voltage value at the time point (time t3 in FIG. 10) when the input of the corrected voltage information is complete (step S1407). Since the input supply voltage matches the corrected voltage value obtained from the corrected voltage information upon completion of the input of the corrected voltage information (time t3 in FIG. 10), the voltage detection unit 1204 detects that the supply voltage has reached the corrected voltage value (YES in step S1408). At this time point, the voltage detection unit 1204 determines that transition from the initial voltage value to the corrected voltage value has been complete (step S1409).

The clock switching signal output from the voltage detection unit 1204 is then switched from the logic to select the 20 MHz in the initial state to the logic to select the 1000 MHz clock from the PLL 112 (step S1410). Subsequently, the system startup sequence is executed with the high-speed clock of 1,000 MHz output from the PLL 112 (step S1411).

As described above, according to this embodiment, the voltage detection unit which has received corrected voltage information monitors the supply voltage to the ASIC, thereby detecting transition to the corrected voltage value and switching the clock immediately after the completion of transition to the corrected voltage.

In addition, this embodiment has exemplified the clock switching timing accompanying overdriven control concerning an operation after the completion of transition to the corrected voltage. However, this is not exhaustive. When an internal logic operation is switched after the supply voltage is stabilized at the corrected voltage value at the time of the execution of ASV control, the internal logic operation is switched upon detecting at an earlier timing that the corrected voltage value is stabilized. This makes it possible to transit to the subsequent processing earlier.

<Third Embodiment>

The first and second embodiments are configured to shorten the time taken for the power supply startup sequence by outputting a clock switching signal upon detecting that the initial voltage value has reached the corrected voltage value. In contrast to this, the third embodiment is configured to shorten the power supply startup sequence time by reducing the difference between an initial voltage and a corrected voltage by changing an initial voltage value.

As shown in FIG. 12, conventionally, an initial voltage value is set to the median (to be referred to as the center voltage value hereinafter) between the upper limit value and the lower limit value of corrected voltage values in consideration of both a case in which a corrected voltage value becomes higher than an initial voltage value and a case in which a corrected voltage value becomes lower than an initial voltage value. Setting an initial voltage value to the center voltage value makes it possible to equally cope with voltage differences both in a case in which a corrected voltage value becomes higher than an initial voltage value and a case in which a corrected voltage value becomes lower than an initial voltage value.

This embodiment is configured to shorten the transit time at the time of voltage correction by reducing the difference between an initial voltage value and a corrected voltage value by changing the initial voltage value in accordance with variation at the time of the manufacture of ASICs. That is, with respect to an ASIC which can operate only slowly due to manufacturing variation as shown in FIG. 13, the voltage transit time is shortened by reducing the difference between an initial voltage value and a corrected voltage value by setting a high initial voltage set value.

More specifically, consider a case in which initial voltage values can be set in three steps as shown in FIG. 4B, and a corrected voltage value of 1.25 V is set for an ASIC which can operate only slowly due to manufacturing variation. In this case, if an initial voltage value is set to 1.10 V, which is the center voltage value, the difference between the initial voltage value and the corrected voltage value is 0.15 V. In this case, if the initial voltage value is set to 1.20 V in advance, the difference from the corrected voltage value becomes 0.05 V. This makes it possible to complete transition to the corrected voltage in a time ⅓ of the transit time to the corrected voltage value when using the center voltage value. In contrast to this, with respect to an ASIC which can operate fast due to manufacturing variation, it is possible to shorten the voltage transit time by reducing the difference from a corrected voltage value by setting an initial voltage value to a low value in advance.

[Circuit Arrangement]

Figure 14:
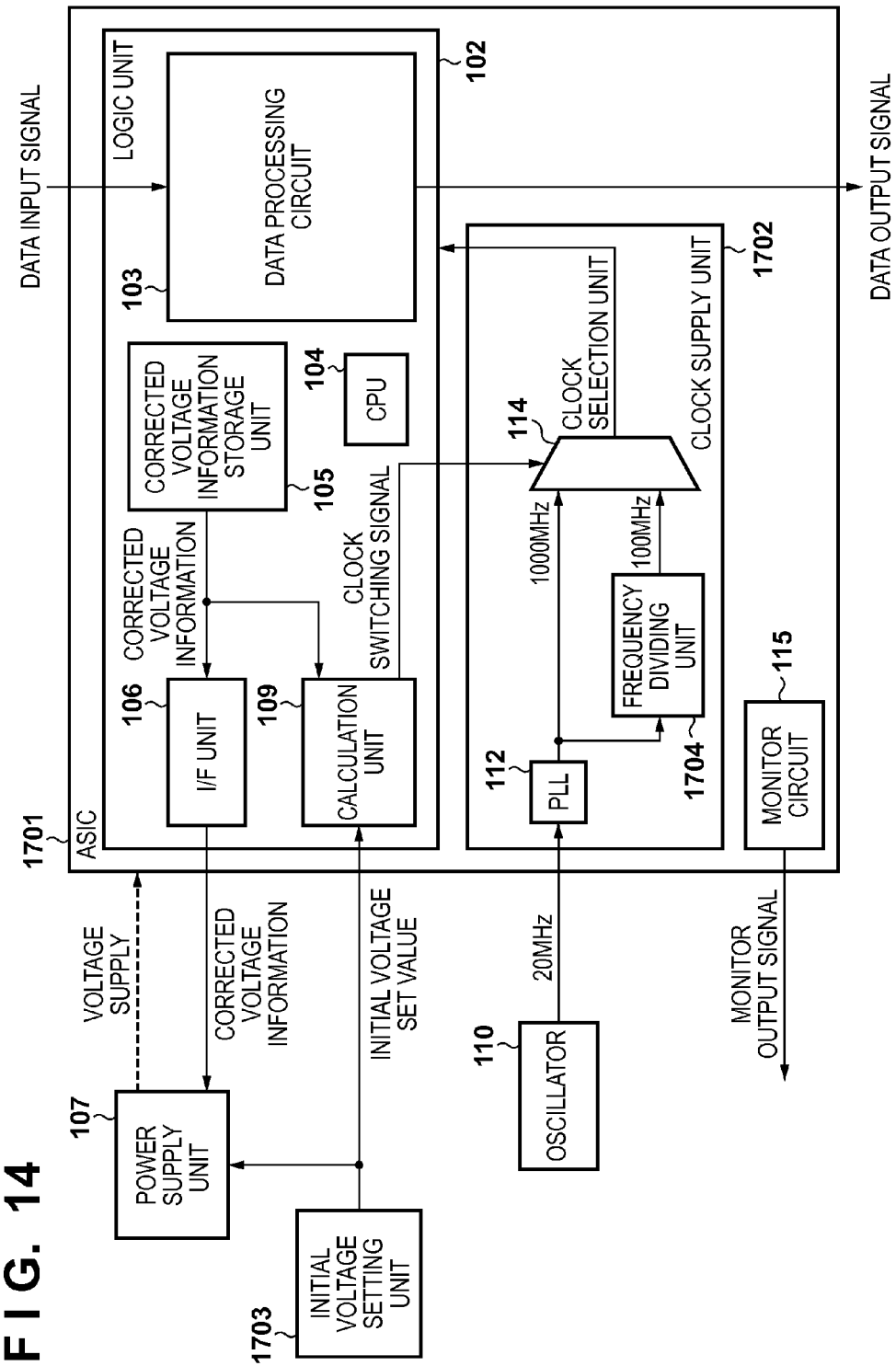
FIG. 14 is a block diagram showing an overall arrangement associated with supply voltage control according to the third embodiment.

FIG. 14 is a block diagram showing the arrangements of an ASIC 1701 in an MFP control unit 9901, its power supply circuit, and a clock generation unit in the use of overdriven control and ASV control according to this embodiment. The same terms and reference numerals denote the same parts as those described in the first embodiment, and a detailed description of them will be omitted.

The ASIC 1701 corresponds to the ASIC 9908 in FIG. 1. In this embodiment, the ASIC 1701 performs a high-speed operation by overdriven control using a voltage higher than the rated voltage as a center voltage value. In addition, the ASIC 1701 in this embodiment performs ASV control by exchanging information with a power supply unit 107.

The power supply unit 107 corresponds to the power supply unit 9909 in FIG. 1. The power supply unit 107 in this embodiment activates the power supply in accordance with information from an initial voltage setting unit 1703, and transits to the power supply voltage to be supplied to the ASIC 1701 in accordance with corrected voltage information from the ASIC 1701.

An oscillator 110 supplies clocks for the operation of the ASIC 1701. The ASIC 1701 incorporates a clock supply unit 1702, which converts a clock input from the oscillator 110 into a clock having a high frequency, and uses it as an operation clock for the logic unit 102 in the ASIC 1701. The clock supply unit 1702 in the ASIC 1701 according to this embodiment incorporates a PLL 112, a frequency dividing unit 1704, and a clock selection unit 114. The PLL 112 generates a 1000 MHz output clock from a 20 MHz clock, which is an input clock from the oscillator 110. The frequency dividing unit 1704 receives the 1000 MHz clock output from the PLL 112, and outputs a 100 MHz clock by dividing the frequency of input clock by 10. The clock selection unit 114 selects the 1000 MHz clock output from the PLL 112 or the 100 MHz clock output from the frequency dividing unit 1704 based on the clock switching signal output from the logic unit 102, and outputs the selected clock to the logic unit 102. In an initial state of power supply startup, the clock selection unit 114 selects the 100 MHz clock output from the frequency dividing unit 1704.

The ASIC 1701 incorporates a monitor circuit 115. When making checks at the time of the manufacture of the ASIC 1701, the monitor circuit 115 outputs information concerning process variation at the time of the manufacture of the ASIC 1701. Information concerning the power supply voltage required for the ASIC 1701 to operate at high speed is stored in a corrected voltage information storage unit 105 based on the process variation information. Since the details of this operation are the same as those in the first embodiment, a detailed description will be omitted.

Figure 19:
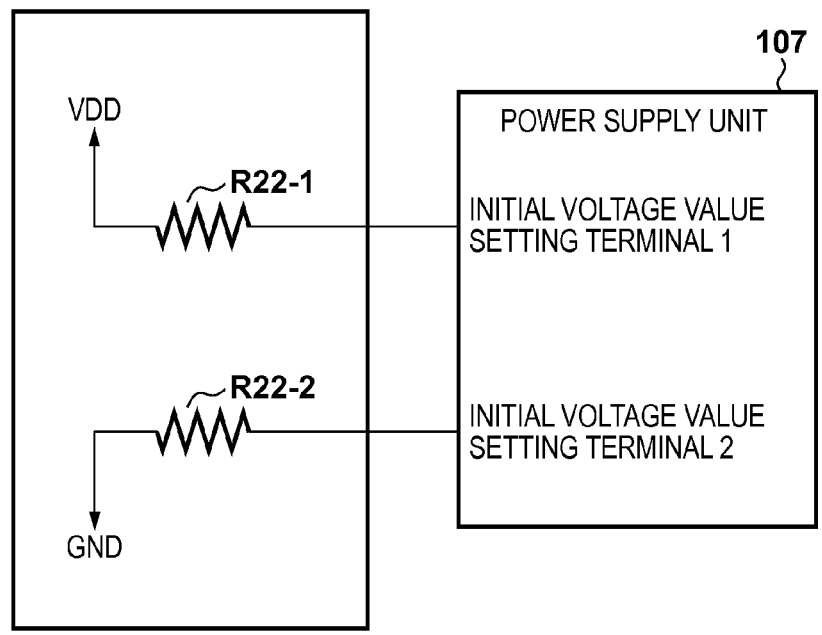
FIG. 19 is a view showing a concrete example of a conventional initial voltage setting method.

In the first and second embodiments, an initial voltage value is set as a fixed value in the power supply unit 107 by using a center voltage value. That is, assume that, as shown in FIG. 19, the power supply unit 107 is formed from ICs. In this case, when ICs are mounted on a substrate, an input pin of an IC for initial voltage setting is connected to a power supply via a resistor or directly connected to the ground. More specifically, when an initial voltage value of 1.10 V is to be set in the power supply unit 107, the initial voltage code is set to "01". In this case, an initial voltage value setting terminal 1 of the power supply unit 107 is connected to the power supply (VDD) side via a register R22-1 to make the power supply unit 107 recognize "1". On the other hand, an initial voltage value setting terminal 2 is connected to the ground (GND) side via a register R22-2 to make the power supply unit 107 recognize "0".

Figure 15:
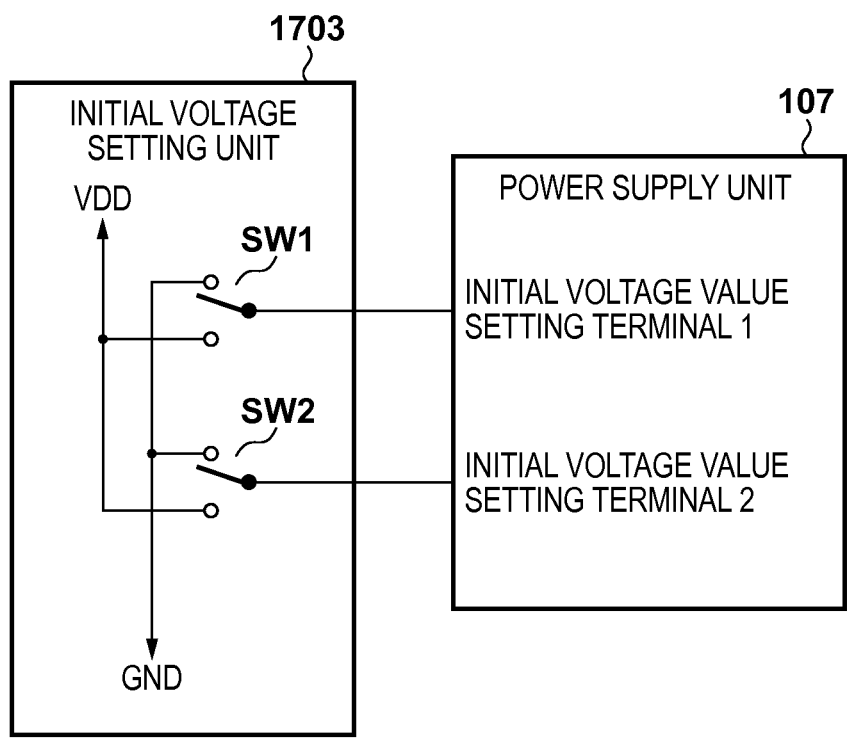
FIG. 15 is a view showing a concrete example of an initial voltage setting method according to the third embodiment.

The third embodiment is configured to change the setting via the initial voltage setting unit 1703. More specifically, as shown in FIG. 15, the connection of each initial voltage value setting terminal to the power supply or ground can be changed via a switch (SW1 or SW2).

Two-step procedures are set in the third embodiment. The first-step procedure is a procedure at the time of the manufacture of a product, and is executed when an MFP is manufactured by using the ASIC 1701. The second-step procedure is a procedure at the time of the use of the product. This procedure in this embodiment is the same as that described with reference to FIG. 8 in the first embodiment.

The first-step procedure will be described in detail. The first-step procedure is a procedure at the time of the manufacture of a product, and is executed in a manufacturing factory or the like at the time of the manufacture of an MFP using the ASIC 1701. In this case, a power supply unit for the ASIC 1701 and the respective types of peripheral units connected to it have arrangements like those shown in FIG. 16, which differ from the arrangements of the product in normal use. In this case, the broken line arrows indicate that data and the like are not actually input and output at the time of manufacture. That is, the power supply unit 107 receives no corrected voltage information, and always supplies power at the same voltage in accordance with the set value in the initial voltage setting unit 1703. In addition, a calculation unit 109 is not used, no control performed on clock switching signals, and the clock selection unit 114 always selects a clock from the frequency dividing unit 1704.

A corrected voltage information read unit 1901 is connected to the I/F unit of the ASIC 1701, and reads out corrected voltage information stored in the corrected voltage information storage unit 105. Based on the corrected voltage information read by the corrected voltage information read unit 1901, a corrected voltage value for the ASIC 1701 is recognized, and the setting of the initial voltage setting unit 1703 is changed to set, as an initial voltage value, a value nearest to the corrected voltage value. More specifically, assume that while the ASIC 1701 can operate only slowly due to manufacturing variation, the corrected voltage value is 1.25 V. In this case, 3-bit information of "000" is stored as a corrected voltage code in the corrected voltage information storage unit 105 in the ASIC 1701, which is then transported from the ASIC manufacturer to a plant of MFPs.

At the time of the manufacture of an MFP, in the plant, the corrected voltage information read unit 1901 reads the corrected voltage code "000", and the initial voltage value is set to 1.20 V, of three-step values like those shown in FIG. 4B, which is nearest to the corrected voltage. In this case, the initial voltage setting unit 1703 is configured to make settings of the initial voltage value setting terminals via switches like those shown in FIG. 15, and hence SW1 and SW2 are respectively set to the ground (GND) side and the power supply (VDD) side to set the initial voltage value to 1.20 V. That is, the initial voltage code "10" shown in FIG. 4B is set. As a consequence, the difference from the corrected voltage value is 0.05 V, and hence the transit time to the corrected voltage becomes ⅓ of that when the initial voltage value is set to 1.10 V, which is the center voltage value.

[Control Procedure (at Time of Manufacture)]

Figure 17:
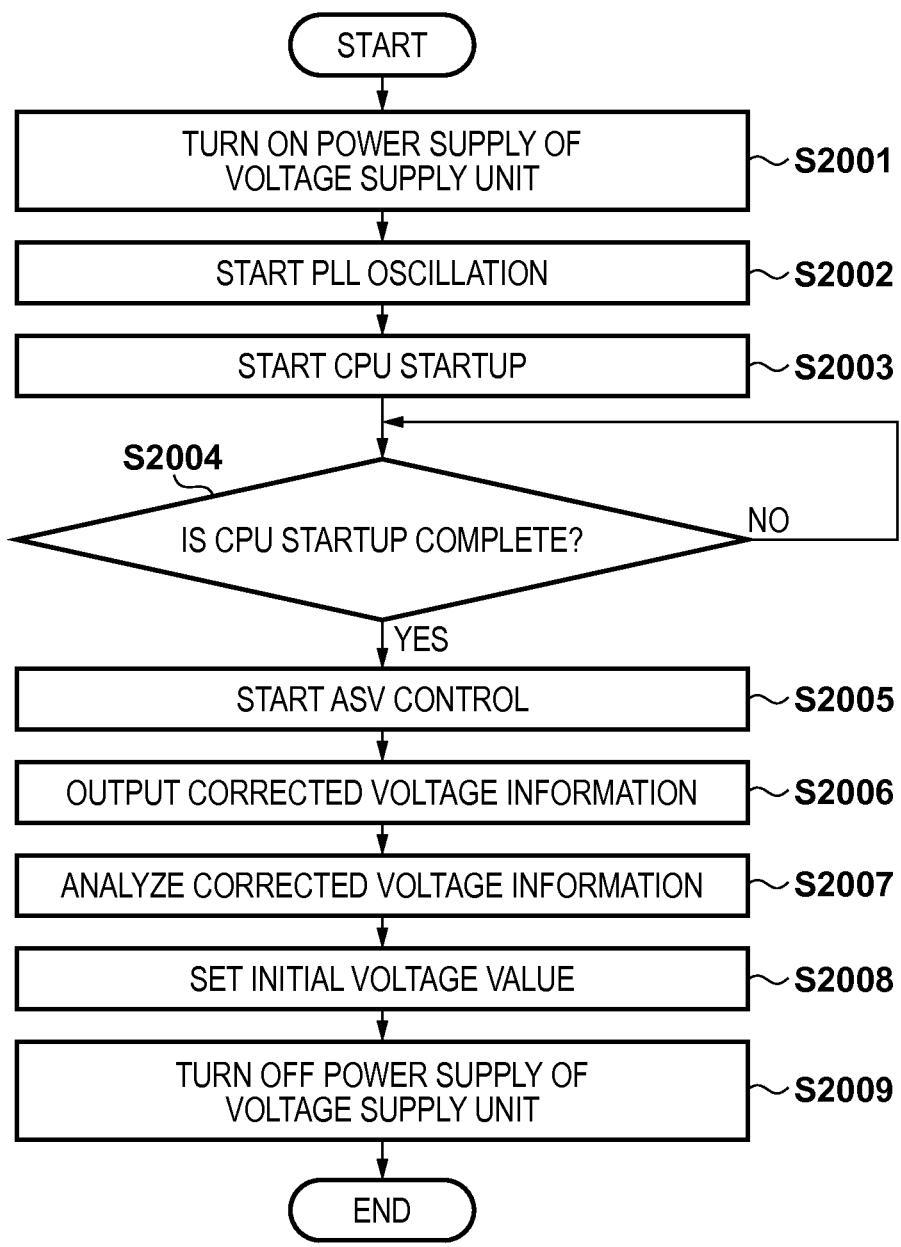
FIG. 17 is a flowchart for control at the time of manufacture according to the third embodiment.

A procedure at the time of the manufacture of a product, which is the first-step procedure, will be described in detail with reference to FIG. 17.

Figure 16:
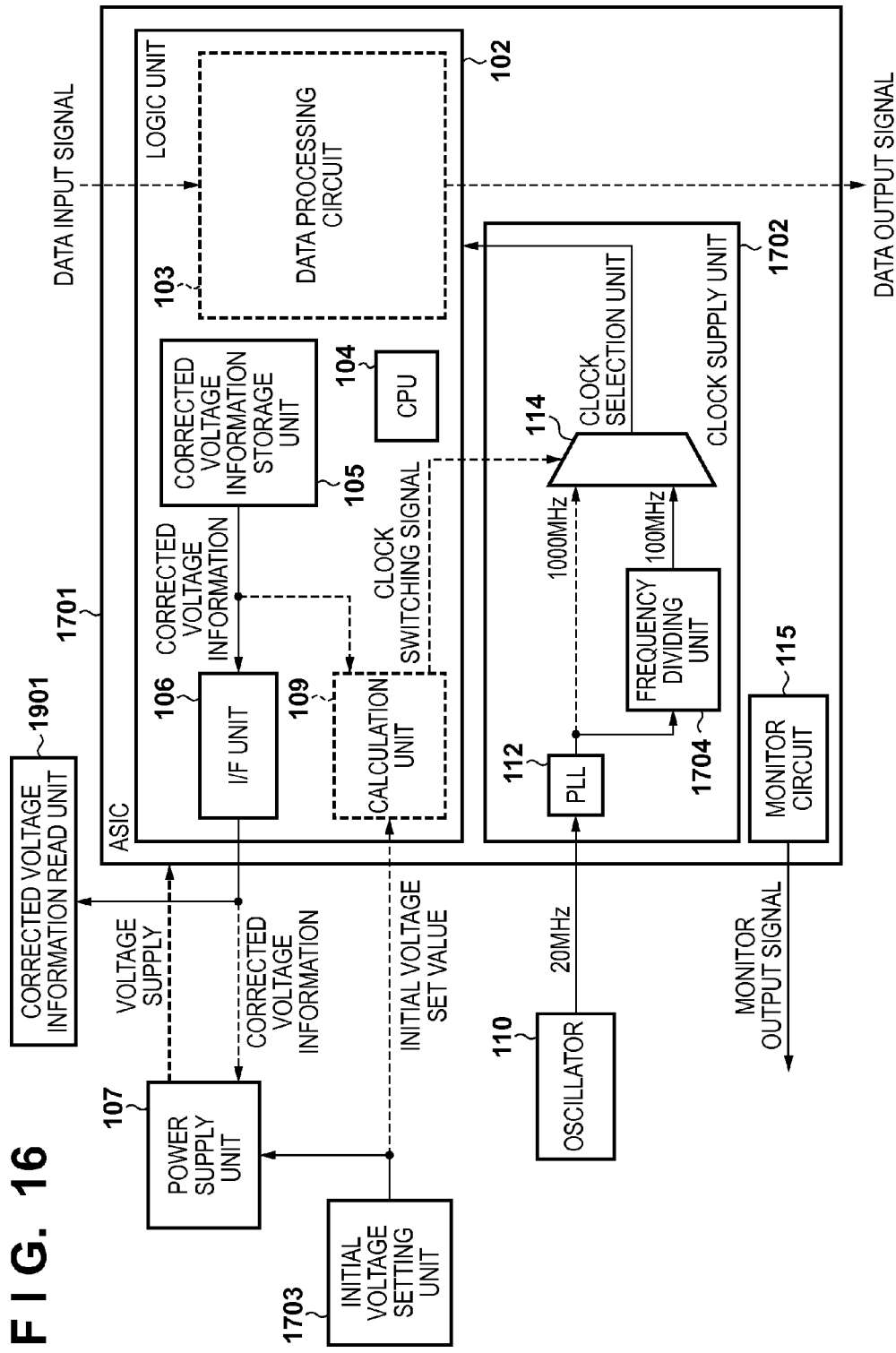
FIG. 16 is a block diagram showing an overall arrangement associated with supply voltage control according to the third embodiment.

At the time of the manufacture of an MFP, a person in charge of manufacture or the like connects the corrected voltage information read unit 1901 to the ASIC 1701, and turns on the power supply of the MFP, thereby turning on the power supply of the power supply unit 107 shown in FIG. 16 (step S2001). At this time, the power supply unit 107 is set to the center voltage value by the initial voltage setting unit 1703.

In the ASIC 1701, upon detection that the supply voltage from the power supply unit 107 has reached the center voltage, which is the initial voltage value, the PLL 112 starts to oscillate (step S2002). In the initial state of the clock selection unit 114 at the time of power supply startup, the frequency dividing unit 1704 is selected. At this time point, the logic unit 102 operates with a 100 MHz clock from the frequency dividing unit 1704.

Subsequently, in accordance with the startup sequence (not shown) stored in a ROM (not shown) or the like, the startup of the CPU 104 starts (step S2003). Upon completion of the startup of the CPU 104 (YES in step S2004), subsequent ASV control is started under the control of the CPU 104 (step S2005). In this embodiment, ASV control is not performed between the ASIC 1701 and the power supply unit 107, and corrected voltage information is output between the ASIC 1701 and the corrected voltage information read unit 1901 (step S2006).

The corrected voltage information read unit 1901 analyzes the input corrected voltage information, and the person in charge of manufacture or the like recognizes a corrected voltage value (step S2007). Based on the recognition result on the corrected voltage value, the initial voltage value setting in the initial voltage setting unit 1703 is set to a voltage value nearest to the corrected voltage value (step S2008). Thereafter, the person in charge of manufacture or the like turns off the power supply to complete the procedure at the time of the manufacture of the product (step S2009). The first-step procedure is executed at the time of the manufacture of the product in the above manner, and the manufactured MFP is delivered to the user.

The second-step procedure is a procedure to be executed at the time of the use of the product. The procedure to be executed at the time of the use of the product is the same as that shown in FIG. 8 described in the first embodiment except that the initial voltage value set when the power supply of the power supply unit 107 is turned on is not limited to a center voltage value and is based on corrected voltage value information. Since an initial voltage value is set so as to minimize the difference from a corrected voltage value, the difference between the initial voltage value and the corrected voltage value becomes small, and the time taken for transition from the initial voltage value to the corrected voltage value is shortened accordingly.

As described above, it is possible to shorten the transit time at the time of the correction of a voltage by reducing the difference between the initial voltage value and the corrected voltage value by changing the initial voltage value in accordance with variation at the time of the manufacture of an ASIC.

[Fourth Embodiment]

The third embodiment is configured to shorten the transit time at the time of the correction of a voltage by reducing the difference between an initial voltage value and a corrected voltage value by changing the initial voltage value in accordance with variation at the time of the manufacture of an ASIC. In this case, to set an initial voltage value, the third embodiment uses a setting method using switches like those shown in FIG. 15.

This embodiment will exemplify another method of setting an initial set value. The arrangements of overdriven control and ASV control systems and operation procedures in this embodiment are the same as those in the third embodiment, and hence a detailed description of them will be omitted. Only an initial voltage setting unit different from that in the third embodiment will be described below.

Figure 18:
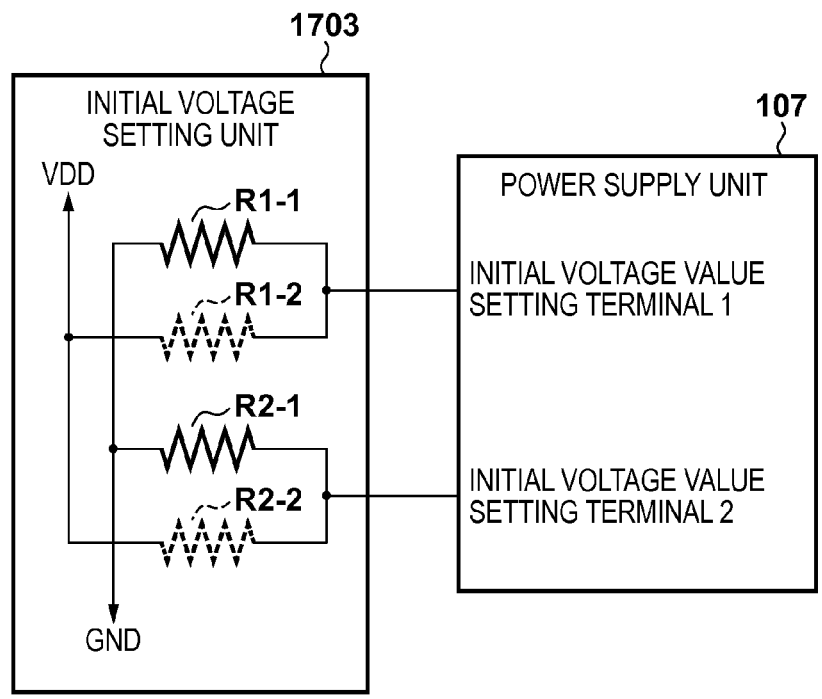
FIG. 18 is a view showing a concrete example of an initial voltage setting method according to the fourth embodiment.

The initial voltage setting unit according to this embodiment will be described with reference to FIG. 18. FIG. 18 shows the arrangement of an initial voltage setting unit 1703 in FIG. 16. In this case, the setting of each initial voltage value setting terminal is switched by mounting or not mounting a pull-up/pull-down resistor on a substrate on which an ASIC 1701 is mounted. Referring to FIG. 18, each resistor indicated by the broken line indicates that the resistor is not mounted.

If the initial voltage value is to be set to 1.00 V, the initial voltage code is set to "00" as shown in FIG. 4B. More specifically, of the pull-up/pull-down resistors connected to an initial voltage value setting terminal 1, a pull-down resistor R1-1 on the ground (GND) side is mounted. In addition, of the pull-up/pull-down resistors connected to an initial voltage value setting terminal 2, a pull-down resistor R2-1 on the ground (GND) side is mounted.

FIG. 18 is a view showing how the initial voltage code "00" is set. When the initial voltage value is set to 1.10 V, the initial voltage code is set to "01" as shown in FIG. 4B. More specifically, of the pull-up/pull-down resistors connected to the initial voltage value setting terminal 1, a pull-down resistor R1-2 on the power supply (VDD) side is mounted. In addition, of the pull-up/pull-down resistors connected to the initial voltage value setting terminal 2, the pull-down resistor R2-1 on the ground (GND) side is mounted.

When the initial voltage value is set to 1.20 V, the initial voltage code is set to "10" as shown in FIG. 4B. More specifically, of the pull-up/pull-down resistors connected to the initial voltage value setting terminal 1, a pull-down resistor R1-1 on the ground (GND) side is mounted. In addition, of the pull-up/pull-down resistors connected to the initial voltage value setting terminal 2, the pull-down resistor R2-2 on the power supply (VDD) side is mounted.

As described above, according to this embodiment, it is possible to shorten the transit time at the time of voltage correction by reducing the difference between an initial voltage value and a corrected voltage value by changing the initial voltage value in accordance with variation at the time of the manufacture of an ASIC. According to the method of setting an initial voltage at this time, the setting of each initial voltage value setting terminal is switched by mounting or not mounting a pull-up/pull-down resistor on a substrate on which an ASIC is mounted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-098888, filed May 12, 2014, which is hereby incorporated by reference herein in its entirety.

What is claimed is:

1. A power supply voltage control system comprising:
   a semiconductor integrated circuit; and
   a power supply unit configured to supply a power supply voltage to the semiconductor integrated circuit,
   the semiconductor integrated circuit including:

a data processing unit configured to operate in any of a plurality of operating states, a storage unit configured to store information of a corrected voltage value required for the data processing unit to operate in a predetermined operating state, an interface unit configured to output, to the power supply unit, the information of the corrected voltage value stored in the storage unit, a clock supply unit configured to supply a clock signal having a first frequency and a clock signal having a second frequency to the data processing unit, and a calculation unit configured to calculate a time taken for an initial voltage value to reach the corrected voltage value based on a difference between the initial voltage value and the corrected voltage value, wherein the power supply unit supplies a voltage to the data processing unit based on the initial voltage value and the clock supply unit supplies the clock signal having the first frequency to the data processing unit at startup of the semiconductor integrated circuit, wherein the interface unit outputs, to the power supply unit, the information of the corrected voltage value stored in the storage unit in accordance with the voltage supplied to the data processing unit having reached the initial voltage value, wherein the power supply unit supplies a voltage to the data processing unit based on the information of the corrected voltage value output from the interface unit, wherein the clock supply unit switches a clock signal to be supplied to the data processing unit from the clock signal having the first frequency to the clock signal having the second frequency based on the initial voltage value and the corrected voltage value, and wherein the clock supply unit controls a timing at which the clock to be supplied to the data processing unit is switched from the clock signal having the first frequency to the clock signal having the second frequency based on the calculated time.

2. The system according to claim 1, further comprising a detection unit configured to detect a voltage which the power supply unit supplies to the data processing unit, wherein the clock supply unit switches the clock signal to be supplied to the data processing unit from the clock signal having the first frequency to the clock signal having the second frequency after the detection unit detects that a voltage supplied by the power supply unit has reached the corrected voltage value.

3. The system according to claim 1, wherein the second frequency is higher than the first frequency.

4. The system according to claim 1, wherein the corrected voltage value is set to a value lower than a reference voltage with respect to a semiconductor integrated circuit which operates faster than a reference in accordance with variation in speed of an operation caused by manufacturing processing of a semiconductor integrated circuit, and is set to a value higher than the reference voltage with respect to a semiconductor integrated circuit which operates slower than the reference.

5. The system according to claim 1, wherein the initial voltage value is set to a value lower than a reference voltage with respect to a semiconductor integrated circuit which operates faster than a reference in accordance with variation in speed of an operation caused by manufacturing processing of a semiconductor integrated circuit, and is set to a value higher than the reference voltage with respect to a semiconductor integrated circuit which operates slower than the reference.

* * * * *